US012676976B2

(12) United States Patent
Leleannec et al.

(10) Patent No.: US 12,676,976 B2
(45) Date of Patent: ***Jul. 7, 2026

(54) METHOD AND APPARATUS FOR ENCODING A PICTURE BLOCK

(71) Applicant: InterDigital VC Holdings, Inc., Wilmington, DE (US)

(72) Inventors: Fabrice Leleannec, Cesson-Sevigne (FR); Franck Galpin, Cesson-Sevigne (FR); Fabien Racape, Palo Alto, CA (US); Sunil Jaiswal, Rennes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,236

(22) Filed: Jun. 20, 2024

(65) Prior Publication Data

US 2024/0348781 A1      Oct. 17, 2024

Related U.S. Application Data

(63) Continuation of application No. 17/897,903, filed on Aug. 29, 2022, now Pat. No. 12,052,418, which is a (Continued)

(30) Foreign Application Priority Data

| Dec. 14, 2017 | (EP) | ..................................... | 17306769 |
| Mar. 27, 2018 | (EP) | ..................................... | 18305341 |
| Mar. 30, 2018 | (EP) | ..................................... | 18305386 |

(51) Int. Cl.
  *H04N 19/119*       (2014.01)
  *H04N 19/102*       (2014.01)
  (Continued)

(52) U.S. Cl.
  CPC ......... *H04N 19/119* (2014.11); *H04N 19/102* (2014.11); *H04N 19/147* (2014.11);
    (Continued)

(58) Field of Classification Search
  CPC .. H04N 19/119; H04N 19/102; H04N 19/147; H04N 19/176; H04N 19/70; H04N 19/96
  See application file for complete search history.

(56) References Cited

U.S. PATENT DOCUMENTS

| 10,462,462 B2 | 10/2019 | Chien et al. |
| 10,735,748 B2 | 8/2020 | Helle et al. |
| | (Continued) | |

FOREIGN PATENT DOCUMENTS

| CN | 101208957 A | 6/2008 |
| CN | 102804777 A | 11/2012 |
| | (Continued) | |

OTHER PUBLICATIONS

Park et al. "Context-Based Ternary Tree Decision Method in Versatile Video Coding for Fast Intra Coding", IEEE Access vol. 7, 2019 (Year: 2019).*

(Continued)

*Primary Examiner* — Richard A Hansell, Jr.
(74) *Attorney, Agent, or Firm* — Condo Roccia Koptiw LLP

(57) ABSTRACT

A method for encoding a block is disclosed. To this aim, a split mode is determined based on a rate-distortion optimization using a texture-based split prediction set obtained for the block. As an example, the split mode is determined by adapting the texture-based split prediction set according to at least one of a binary or triple split mode non-redundancy constraint or a heuristic-based split mode set pruning. The block is finally encoded using the determined split mode.

20 Claims, 19 Drawing Sheets

1701 — Determining split mode for a current block

1702 — Obtaining texture-based split prediction

1703 — Adapting texture-based split prediction

1704 — Encoding current block

Related U.S. Application Data continuation of application No. 16/772,037, filed as application No. PCT/US2018/059535 on Nov. 7, 2018, now Pat. No. 11,438,587.

(51) Int. Cl.

| | |
|---|---|
| *H04N 19/147* | (2014.01) |
| *H04N 19/176* | (2014.01) |
| *H04N 19/70* | (2014.01) |
| *H04N 19/96* | (2014.01) |

(52) U.S. Cl.
CPC ........... *H04N 19/176* (2014.11); *H04N 19/70* (2014.11); *H04N 19/96* (2014.11)

(56) References Cited

U.S. PATENT DOCUMENTS

| | | | |
|---|---|---|---|
| 2006/0294171 A1 | 12/2006 | Bossen et al. | |
| 2011/0170593 A1 | 7/2011 | Kim et al. | |
| 2011/0249181 A1 | 10/2011 | Iwami et al. | |
| 2013/0022129 A1 | 1/2013 | Liu et al. | |
| 2013/0215959 A1 | 8/2013 | Chen et al. | |
| 2013/0259118 A1 | 10/2013 | Fu et al. | |
| 2013/0322542 A1 | 12/2013 | Senzaki et al. | |
| 2014/0146884 A1 | 5/2014 | Cho et al. | |
| 2014/0219331 A1 | 8/2014 | Pai et al. | |
| 2014/0254661 A1 | 9/2014 | Saxena et al. | |
| 2016/0014434 A1 | 1/2016 | Liu et al. | |
| 2016/0134874 A1 | 5/2016 | Konieczny et al. | |
| 2016/0234492 A1 | 8/2016 | Li et al. | |
| 2017/0078697 A1* | 3/2017 | Lee | H04N 19/70 |
| 2017/0127059 A1 | 5/2017 | Kim et al. | |
| 2017/0208336 A1* | 7/2017 | Li | H04N 19/172 |
| 2018/0020218 A1 | 1/2018 | Zhao et al. | |
| 2018/0048901 A1 | 2/2018 | Zhang et al. | |
| 2018/0192069 A1 | 7/2018 | Chen et al. | |
| 2019/0075328 A1* | 3/2019 | Huang | H04N 19/70 |
| 2019/0182505 A1* | 6/2019 | Chuang | H04N 19/52 |
| 2020/0145698 A1* | 5/2020 | Gao | H04N 19/119 |
| 2020/0236359 A1* | 7/2020 | Gao | H04N 19/30 |
| 2022/0132103 A1* | 4/2022 | Li | H04N 19/105 |

FOREIGN PATENT DOCUMENTS

| | | | |
|---|---|---|---|
| CN | 103392338 A | 11/2013 | |
| CN | 103491369 A | 1/2014 | |
| CN | 103491380 A | 1/2014 | |
| CN | 103688540 A | 3/2014 | |
| CN | 104023233 A | 9/2014 | |
| CN | 105120291 A | 12/2015 | |
| EP | 2143279 A1 | 1/2010 | |
| EP | 2143279 B1 | 10/2010 | |
| EP | 2816805 A1 | 12/2014 | |
| EP | 2988503 A1 | 2/2016 | |
| WO | 2010123862 A1 | 10/2010 | |
| WO | 2012/096146 A1 | 7/2012 | |
| WO | 2015139165 A1 | 9/2015 | |
| WO | 2017008678 A1 | 1/2017 | |
| WO | 2018065250 A1 | 4/2018 | |
| WO | WO-2019072367 A1 * | 4/2019 | H04N 19/96 |

OTHER PUBLICATIONS

Bross et al. "Developments in International Video Coding Standardizaton After AVC, With an Overview of Versatile Video Coding", vol. 109, No. 9, Sep. 2021, Proceedings of the IEEE (Year: 2021).*

Bross et al. "Overview of the Versatile Video Coding (VVC) Standard and Its Applications", IEEE Transactions on Cicuits and Systems for Video Technology, vol. 31, No. 10, Oct. 2021. (Year: 2021).*

Ahmadianpour, et al., "Novel Techniques for Reducing Blocking Artifacts in Motion Compensated Frame", Journal of Electronic Imaging, vol. 15, No. 1, Listed in Global Dossier as SPIE XP040214388 dated May 31, 2006, Jan.-Mar. 2006, pp. 013007-1-013007-8.

Chen, et al., "Algorithm Description of Joint Exploration Test Model 6 (JEM 6)", JVET-F1001-V3, Editors, Joint Video Exploration Team (JVET) of ITU-T SG 16 WP3 and ISO/IEC JTC 1/SC 29/WG 11, 6th Meeting: Hobart, AU, Mar. 31-Apr. 7, 2017, 48 pages.

Chen, et al., "Algorithm Description of Joint Exploration Test Model 6 (JEM 6)", JVET-F1001-V2, Editors, Joint Video Exploration Team (JVET) of ITU-T SG 16 WP 3 and ISO/IEC JTC 1/SC 29/WG 11, Hobart, AU, Mar. 31-Apr. 7, 2017, 49 pages.

Chen, et al., "Variable Block-Size Overlapped Block Motion Compensation in the Next Generation Open-source Video Codec", IEEE International Conference on Image Processing (ICIP), Sep. 17, 2017, pp. 938-942.

Chen, J et al., "Algorithm Description of Joint Exploration Test Model 5 (JEM 5)", JVET-E1001-V2, Editors, Joint Video Exploration Team (JVET) of ITU-T SG 16 WP 3 and ISO/IEC JTC 1/SC 29/WG 11, 5th Meeting: Geneva, CH, Feb. 12-20, 2017, 56 pages.

Chen, Jianle et al., "Algorithm Description of Joint Exploration Test Model 2", JVET of ITU-T SG 16 WP 3 and ISO/IEC JTC 1/SC 29/WG 11; 2nd Meeting: San Diego, California, USA; JVET-B1001_V3, Feb. 20-26, 2016, 32 pages.

Chen, Jianle et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, 7th Meeting: Torino, IT; Editors; JVET-G1001-V1, Jul. 13-21, 2017, 48 pages.

Cho, et al., "Fast CU Splitting and Pruning for Suboptimal CU Partitioning in HEVC Intra Coding", IEEE Transactions on Circuits and Systems for Video Technology, vol. 23, No. 9, Sep. 2013, pp. 1555-1564.

Fu, et al., "Sample Adaptive Offset for HEVC", IEEE 13th International Workshop on Multimedia Signal Processing, Hangzhou, 2011, 5 pages.

Grecos, Christos, "Beyond the High Efficiency Video Coding Standard: An Overview", Proceedings of SPIE, vol. 10223, May 1, 2017, pp. 102230F-1-102230F-1.

Guo, et al., "Gradient Based Fast CU Splitting and Mode Decision Algorithm for HEVC Intra Prediction", IEEE 2014 International Conference on Anti-Counterfeiting, Security and Identification, Dec. 12, 2014, 5 pages.

Har-Noy, et al., "Adaptive In-Loop Prediction Refinement for Video Coding", Multimedia Signal Processing, 9th Workshop on IEEE, Piscataway, Oct. 1, 2007, 4 pages.

Huang, et al., "Affine Skip and Direct Modes for Efficient Video Coding", Visual Communications and Image Processing (VCIP), IEEE, Nov. 27, 2012, 6 pages.

ITU-T, "High Efficiency Video Coding", H.265-v2, Series H: Audiovisual and Multimedia Systems, Infrastructure of Audiovisual Services—Coding of Moving Video, Oct. 2014, 540 pages.

ITU-T, "High Efficiency Video Coding", Recommendation ITU-T H.265, Series H: Audiovisual and Multimedia Systems, Infrastructure of Audiovisual Services—Coding of Moving Video, Apr. 2015, 636 pages.

Li, et al., "Non CE4: Fine Granularity QP Offset", JCTVC-G850, MediaTek Inc., Qualcomm Inc., Joint Collaborative Team on Video Coding (JCT-VC) of ITU-T SG16 WP3 and ISO/IEC JTC1/SC29/WG11, 7th Meeting: Geneva, CH, Nov. 21-30, 2011, pp. 1-9.

Li, Xiang et al., "Multi-Type-Tree", JVET-D0117, Qualcomm Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-3.

Lin, Sixin et al., "Affine Transform Prediction for Next Generation Video Coding", Huawei Technologies, ISO/IEC JTC1/SC29/WG11 MPEG2015/m37525, Geneva, Switzerland, Oct. 2015, 10 pages.

Park, et al., "Context-Based Ternary Tree Decision Method in Versatile Video Coding for Fast Intra Coding", IEEE Access vol. 7, 2019, Nov. 27, 2019, 9 pages.

Reichel, "Joint Scalable Video Model JSVM-12 Text", JVT-Y202, JVT, Joint Video Team (JVT) of ISO/IEC MPEG & ITU-T VCEG (ISO/IEC JTC1/SC29/WG11 and ITU-T SG16 Q.6), 25th Meeting: Shenzhen, CN, Oct. 21-26, 2007, pp. 1-113.

(56)          References Cited

OTHER PUBLICATIONS

Reznik, Yuriy A. "Relationship Between DCT-II, DCT-VI, and DST-VII Transforms", IEEE, May 26-31, 2013, pp. 5642-5646.

Suehring, et al., "JVET Common Test Conditions and Software Reference Configurations", JVET-B1010, Joint Video Exploration Team (JVET) of ITU-T SG16 WP3 and ISOJIEC JTC 1/SC291WG 11, 2nd Meeting, San Diego, California, USA, Feb. 20, 2016, 4 pages.

Wang, et al., "Image Quality Assessment: From Error Visibility to Structural Similarity", IEEE Transactions on Image Processing, vol. 13, No. 4, Apr. 2004, pp. 600-612.

Wei, et al., "Modified Winner Update with Adaptive Block Partition for Fast Motion Estimation", 2006 IEEE International Conference on Multimedia and Expo (ICME 2006), Ontario, Canada, Jul. 9, 2006, pp. 133-136.

Wen, et al., "Parallel Merge/Skip Mode for HEVC", JCTVC-G387, Hong Kong University of Science and Technology, Joint Collaborative Team on Video Coding (JCT-VC) of ITU-T SG16 WP3 and ISO/IEC JTC1/SC29/WG11, 7th Meeting: Geneva, CH, Nov. 21-30, 2011, pp. 1-13.

Xu, et al., "Chroma QP Extension and Signalling Enhancement", JCTVC-I0265r1, Sony Electronics Inc., Magnum Semiconductor Inc., Sony Corp., Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, pp. 1-11.

Zhou, et al., "New Rate-Complexity-Quantization Modeling and Efficient Rate Control for H.264/AVC", IEEE, Jun. 23, 2008, pp. 717-720.

Liu, et al., "An Adaptive Mode Decision Algorithm Based on Video Texture Characteristics for HEVC Intra Prediction", IEEE Transactions on Circuits and Systems for Video Technology, vol. 27, No. 8, Aug. 2017, 12 pages.

Shen, Liquan et al., "Effective CU Size Decision for HEVC Intracoding", IEEE Transactions on Image Processing; vol. 23, No. 10, 10 pages, Oct. 2014.

Zhang, et al., "Fast Intra Mode and CU Size Decision for Hevc", IEEE Transactions on Circuits and Systems for Video Technology, vol. 27, No. 8, Aug. 2017, 13 pages.

Zhang, et al., "Test Model 7 of 3D-HEVC and Mv-Hevc", JCT3V-G1005, Editor, Joint Collaborative Team on 3D Video Coding Extension Development of ITU-T SG 16 WP 3 and ISO/IEC JTC 1/SC 29/WG 11, 7th Meeting: San Jose, US, Jan. 11-17, 2014, 53 pages.

Zhou, et al., "Fast HEVC CU/PU Mode Decision Based on ANN and Texture Analysis", IEEE, 2016 Sixth International Conference on Image Processing Theory, Tools and Applications (IPTA), Oulu, Finland, 2016, 6 pages.

* cited by examiner

Fig.5

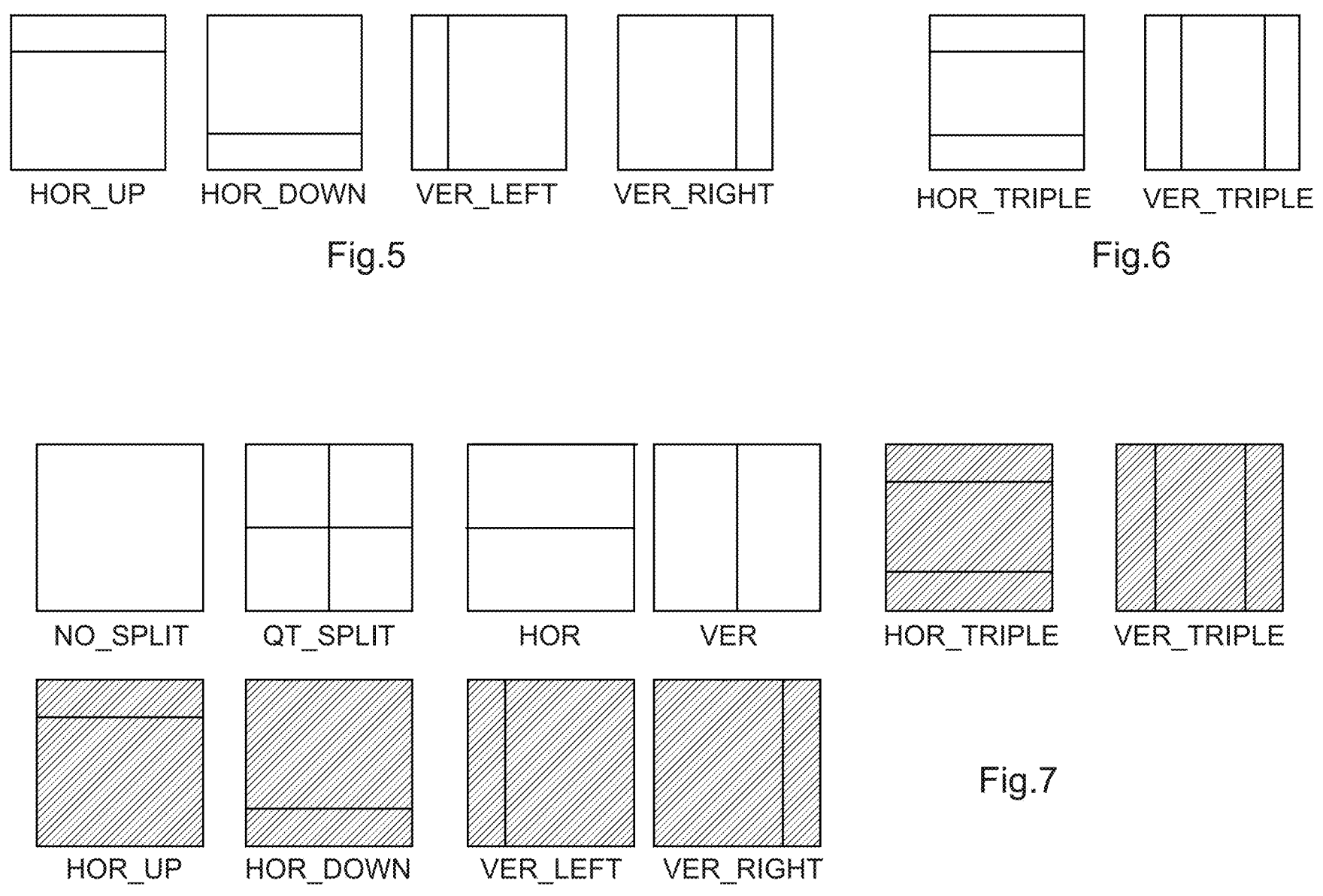

HOR_UP    HOR_DOWN    VER_LEFT    VER_RIGHT

Fig.6

HOR_TRIPLE    VER_TRIPLE

Fig.7

NO_SPLIT    QT_SPLIT    HOR    VER

HOR_UP    HOR_DOWN    VER_LEFT    VER_RIGHT

HOR_TRIPLE    VER_TRIPLE

METHOD AND APPARATUS FOR ENCODING A PICTURE BLOCK

CROSS-REFERENCE TO RELATED APPLICATIONS

This application is a continuation of U.S. application Ser. No. 17/897,903 (now U.S. Pat. No. 12,052,418) which is a continuation of U.S. patent application Ser. No. 16/772,037 (now U.S. Pat. No. 11,438,587), which is the national stage entry under 35 U.S.C. § 371 of International Application PCT/US2018/059535, filed Nov. 7, 2018, which claims the benefit of European Patent Application No. 17306769.5, filed Dec. 14, 2017, European Patent Application No. 18305341.2, filed Mar. 27, 2018, and European Patent Application No. 18305386.7, filed Mar. 30, 2018, the disclosures of each of which are incorporated by reference herein in their entireties.

TECHNICAL FIELD

The present embodiments generally relate to a method and a device for picture encoding, and more particularly, to a method and a device for picture encoding and decoding that uses coding tree based partitioning.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors or prediction residuals, are transformed, quantized and entropy coded. During encoding the original image block is usually partitioned/split into sub-blocks possibly using quad-tree partitioning. To reconstruct the video, the compressed data is decoded by inverse processes corresponding to the prediction, transform, quantization and entropy coding.

To achieve good compression efficiency, image and video schemes generally divide the images to encode into blocks and subblocks in a binary or quad tree fashion. The encoding process complexity grows with the number of split configurations that can possibly be used for encoding a block. Some encoding optimization methods exist for reducing the number of split configurations to be evaluated when encoding a block so as to reduce encoding complexity while avoiding reducing compression efficiency.

However, some encoding optimization methods may collide when used in a same encoding scheme.

SUMMARY

In an embodiment, a method for video encoding is disclosed. The method for video encoding comprises determining for a block to encode, a split mode based on a rate-distortion optimization using a texture-based split prediction set obtained for the block, wherein determining the split mode comprises adapting the texture-based split prediction set according to at least one of a binary or triple split mode non-redundancy constraint or a heuristic-based split mode set pruning, and encoding the block using the determined split mode.

Advantageously, compression efficiency is preserved while the methods for reducing encoding complexity at the encoder can be used without conflicting.

According to at least one embodiment, the texture-based split prediction set comprises for each split mode possible for the block, an indicator indicating whether the split mode is likely to be chosen for the block during the rate-distortion optimization.

According to another embodiment, adapting the texture-based split prediction set according to a heuristic-based split mode set pruning comprises forcing a quad-tree split mode of the block to be evaluated in the rate-distortion optimization if the heuristic-based split mode set pruning allows only the quad-tree split mode.

According to another embodiment, adapting the texture-based split prediction set according to a heuristic-based split mode set pruning further comprises forcing a quad-tree split mode of the block to be evaluated in the rate-distortion optimization if no binary or triple tree split modes is allowed for a current quad-tree depth level.

According to another embodiment, adapting the texture-based split prediction set according to a binary or triple split mode non-redundancy constraint comprises:

checking, for each split mode from the texture-based split prediction set that is likely to be chosen for the block during the rate-distortion optimization, if the split mode is allowed by the binary or triple split mode non-redundancy constraint, if none of the split modes from the texture-based split prediction set that are likely to be chosen for the block during the rate-distortion optimization, is allowed by the binary or triple split mode non-redundancy constraint, forcing at least one split mode allowed by the binary or triple split mode non-redundancy constraint to be evaluated in the rate-distortion optimization.

According to another embodiment, all split modes allowed by the binary split mode non-redundancy constraint are forced to be evaluated in the rate-distortion optimization.

According to another embodiment, only a binary or triple split mode that is first encountered in the texture-based split prediction set is forced to be evaluated in the rate-distortion optimization.

According to another embodiment, at least a horizontal binary or triple split mode and a vertical binary or triple split mode that are first encountered in the texture-based split prediction set are forced to be evaluated in the rate-distortion optimization.

According to another embodiment, the binary or triple split mode non-redundancy constraint or the heuristic-based split mode set pruning depends on a binary or triple tree depth of the block.

In another embodiment, an encoding apparatus is disclosed. Such an apparatus comprises means for determining, for a block to encode, a split mode based on a rate-distortion optimization using a texture-based split prediction set obtained for the block, wherein the means for determining the split mode comprises means for adapting the texture-based split prediction set according to at least one of a binary or triple split mode non-redundancy constraint or a heuristic-based split mode set pruning, and means for encoding the block using the determined split mode.

In a variant, an encoding apparatus is disclosed that comprises a communication interface configured to access a block of a picture and at least one processor configured to:

determine a split mode based on a rate-distortion optimization using a texture-based split prediction set obtained for the accessed block, wherein to determine the split mode comprises to adapt the texture-based split prediction set according to at least one of a binary or triple split mode non-redundancy constraint or a heuristic-based split mode set pruning, and encode the accessed block using the determined split mode.

One or more of the present embodiments also provide a computer readable storage medium having stored thereon instructions for encoding video data according to any of the encoding methods described above. The present embodiments also provide a computer program product including instructions for performing any of the methods described. A bitstream is disclosed that is formatted to include encoded data representative of a block of a picture, the encoded data encoded according to any of the encoding methods described above.

BRIEF DESCRIPTION OF THE DRAWINGS

FIG. 5 shows examples of additional coding unit binary asymmetric split modes.

FIG. 6 shows triple mode splitting of a block.

FIG. 7 shows the set of all Coding Unit split modes supported in the video coding scheme described herein.

DETAILED DESCRIPTION

In the HEVC video compression standard (International Telecommunication Union, ITU-T H.265 High Efficiency Video Coding), a picture is divided into so-called Coding Tree Units (CTU), whose size is typically 64×64, 128×128, or 256×256 pixels.

Figures 1, 2:
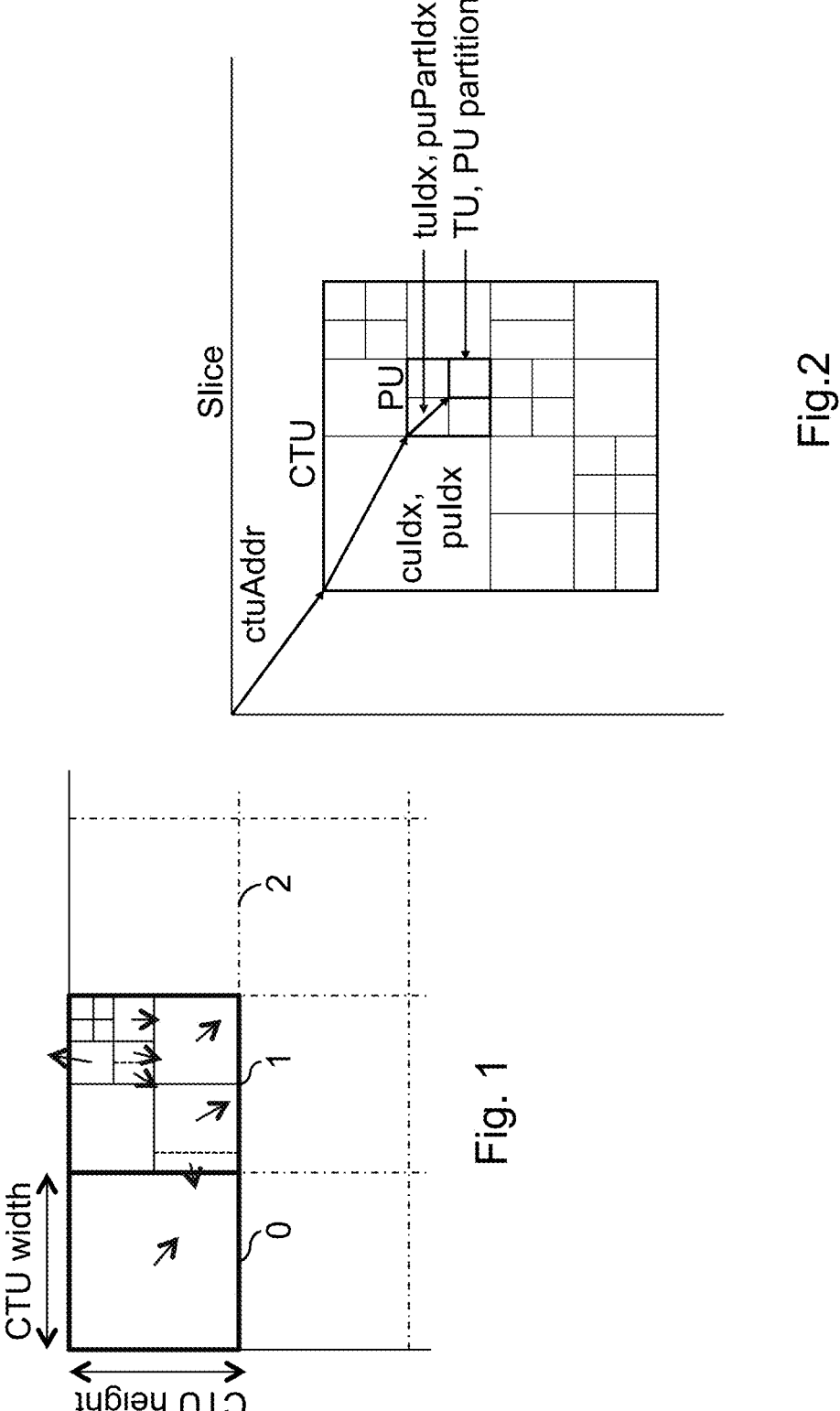
FIG. 1 shows one example of a coding tree unit and coding tree concepts to represent a compressed picture.
FIG. 2 shows an example of the division of a coding tree unit into coding units, prediction units and transform units.

Each CTU is represented by a Coding Tree in the compressed domain. This is a quad-tree division of the CTU, where each leaf is called a Coding Unit (CU), as shown in FIG. 1.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

Figures 3, 4:
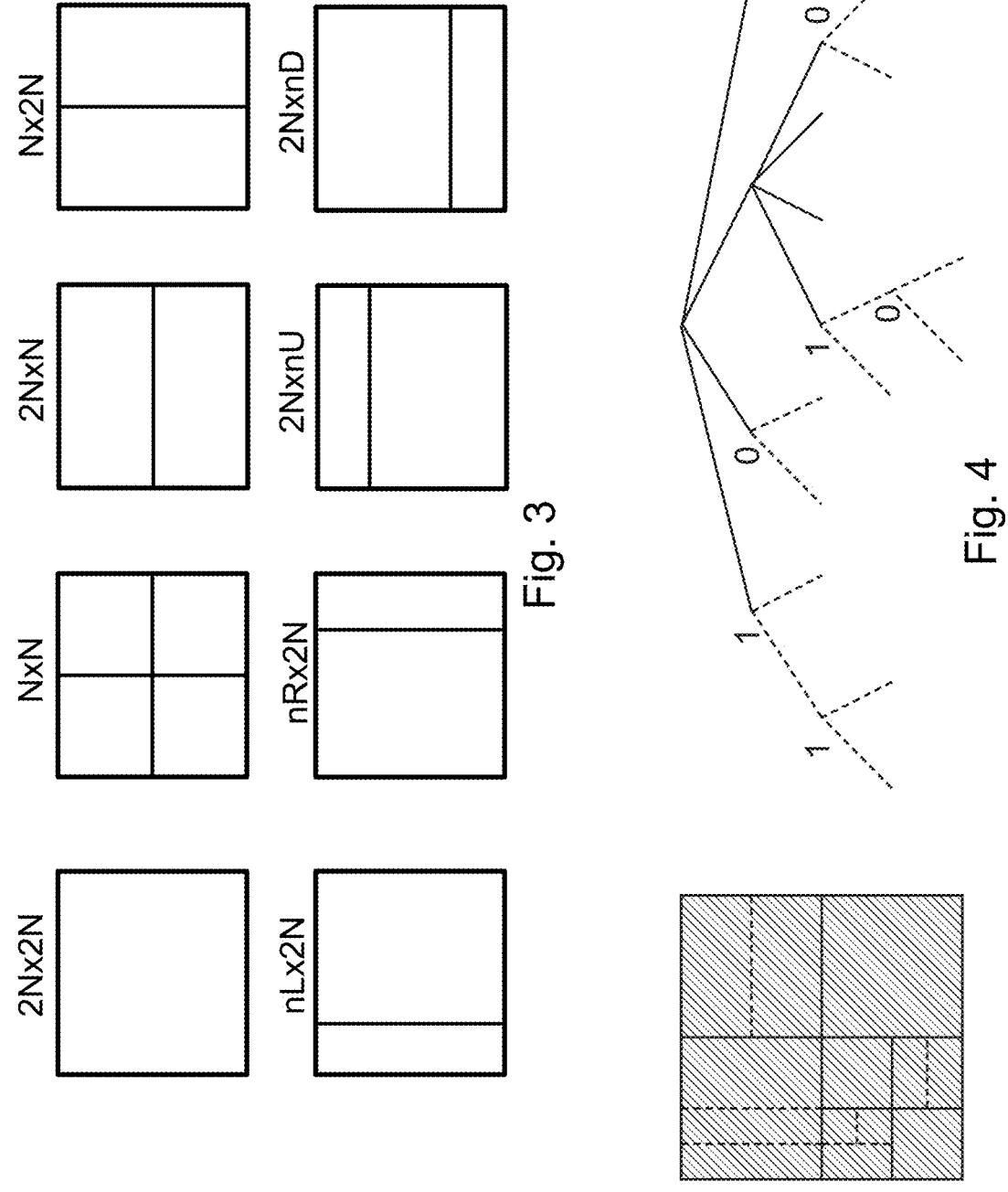
FIG. 3 shows an example of partitioning of coding units into predition units according to HEVC.
FIG. 4 shows an example of quad-tree plus binary-tree coding tree unit representation.

The Partitioning of a Coding Unit into Prediction Unit(s) is done according to the partition type, signaled in the bit-stream. For Intra coding unit, only the partition types 2N×2N and N×N, illustrated in FIG. 3, are used. This means only square Prediction Units are used in Intra Coding Units. On the contrary, Inter Coding Units can use all partition types shown in FIG. 3.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools including a Coding Tree Unit representation in the compressed domain are proposed, in order to represent picture data in a more flexible way in the compressed domain. The advantage of this flexible representation of the coding tree is that it provides increased compression efficiency compared to the CU/PU/TU arrangement of the HEVC standard. In particular, a CU is not further partitioned into PU/TU as in HEVC, i.e. a CU is made of a single PU and a single TU.

The Quad-Tree plus Binary-Tree (QTBT) coding tool provides this increased flexibility. It consists in a coding tree where coding units can be split both in a quad-tree and in a binary-tree fashion. Such coding tree representation of a Coding Tree Unit is illustrated in FIG. 4 wherein a partitioned block is represented on the left and the corresponding QTBT coding tree is represented on the right of FIG. 4.

The splitting of a coding unit is decided on the encoder side through a rate distortion optimization procedure, which consists in determining the QTBT representation of the CTU with minimal rate distortion cost.

In the QTBT technology, a CU has either square or rectangular shape. The size of coding unit is always a power of 2, and typically goes from 4 to 128.

In addition to this variety of rectangular shapes for a coding unit, this new CTU representation has the following different characteristics compared to HEVC:

The QTBT decomposition of a CTU is made of two stages: first the CTU is split in a quad-tree fashion, then each quad-tree leaf can be further divided in a binary fashion. This is illustrated on the right of FIG. 4 where solid lines represent the quad-tree decomposition phase and dashed lines represent the binary decomposition that is spatially embedded in the quad-tree leaves.

In intra slices, the Luma and Chroma block partitioning structure is separated, and decided independently.

No more CU partitioning into predictions units or transform unit is employed. In other words, each Coding Unit is systematically made of a single prediction unit (previously 2N×2N prediction unit partition type) and single transform unit (no division into a transform tree).

Finally, Coding Units with new rectangular shapes have been proposed, resulting from a new Binary Split mode called asymmetric split mode as illustrated on FIG. 5.

This means new rectangular CU shapes are added. These new shapes consist in sizes equal to $3 \cdot 2^n$ in width and/or height. Furthermore, a CU with a size multiple of 3 in width or height can be further split in a binary fashion, horizontally or vertically.

Consequently, a square coding unit with size (w, h) (width and height) that would be split through one of the proposed asymmetric binary split modes, for example HOR_UP (horizontal-up), would lead to 2 sub-coding units with respective rectangular sizes (w, h/4) and (w, 3h/4).

Therefore, a CU with width or height equal to $3 \cdot 2^n$ may be selected by the encoder. In such case, an Intra prediction and Inter process of some rectangular blocks with size multiple of 3 are performed. Additionally, a 2D transform with size $3 \cdot 2^n$ in width or height, and the subsequent transform coefficient entropy coding process are performed. These technical aspects did not exist in HEVC or in QTBT.

A last coding unit split mode, called the horizontal or vertical triple tree split mode, consists in dividing a coding unit (CU) into 3 sub-coding-units (sub-CUs), with respective sizes equal ¼, ½ and ¼ of the parent CU size in the direction of the considered spatial division. This is illustrated on FIG. 6. The complete set of CU split modes present in such codec are shown on FIG. 7.

In the video coding/decoding schemes disclosed herein, all the CU split modes of FIG. 7 are activated, which means the encoder can choose any of these split modes and signal them to the decoder.

Figure 8:
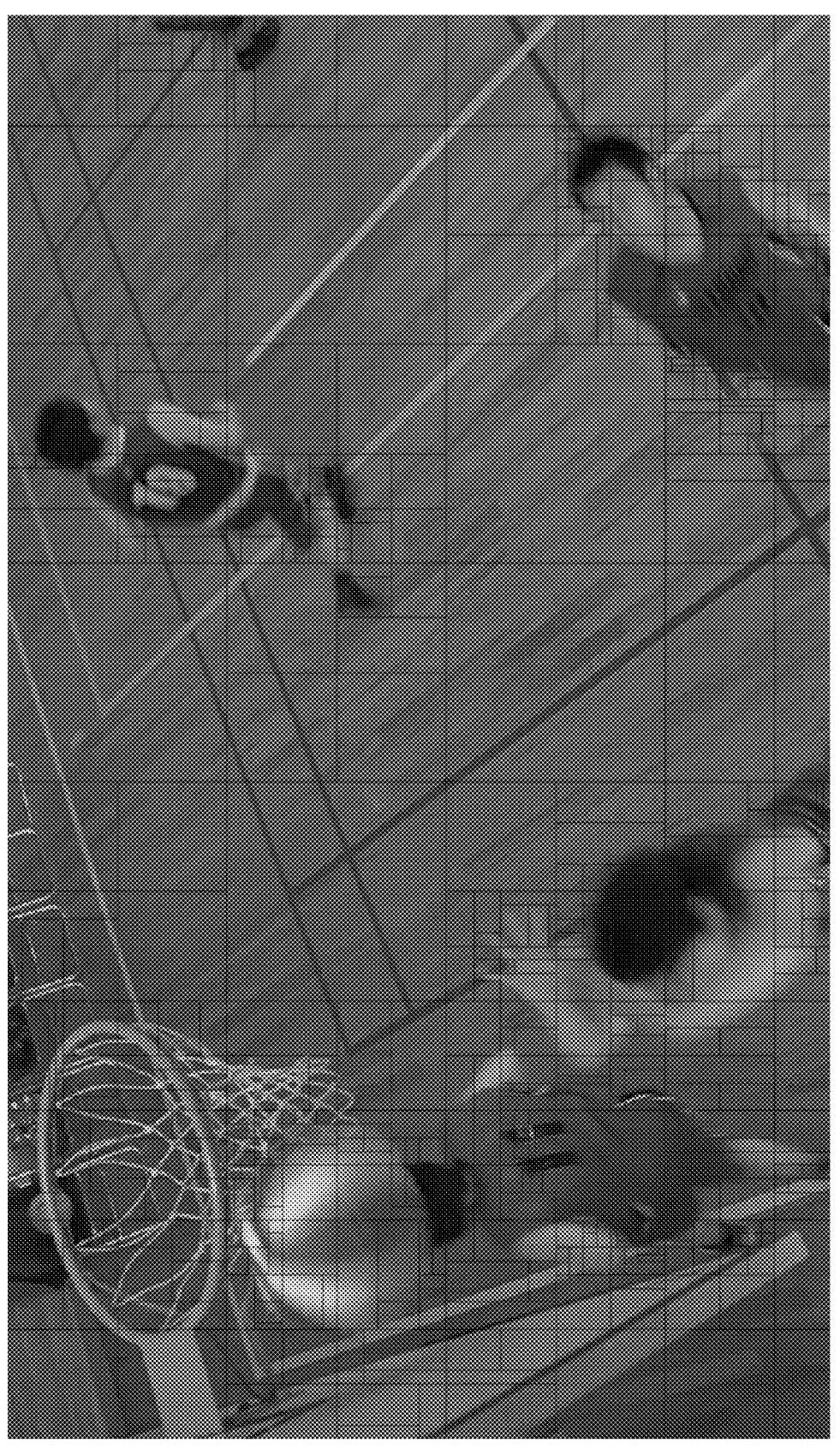
FIG. 8 illustrates a video picture partitionned into coding units selected by an encoder.

FIG. 8 illustrates the coding units chosen by the encoder on an exemplary sequence. One sees that all coding units splitting types are often used in this exemplary picture. One also notes that this rich set of coding unit topologies help in having coding structures that spatially match the structures and discontinuities contained in the original signal.

The counterpart of the coding gain offered by the flexible Coding Representation through multiple CU partition types is an increased combinatory in the rate distortion optimization that takes place on the encoder side.

Some improvements have been proposed for speeding up the encoder rate distortion optimization while limiting to decrease the coding gain offered by the flexible Coding Representation through multiple CU partition types.

For instance, two types of methods already exist in considered video encoder:

Some heuristic-based criterions are used to bypass the evaluation of some split modes, for a given CU. Such criteria typically consider the coding modes, CU depth, etc. associated with the already coded CU around the current CU. They take place on the encoder side only; and A normative split mode discarding process which aims at avoiding any redundancy between different CU divisions. More precisely, it limits the number of allowed split modes for a given CU i.e. it disallows some split modes, in such a way that at most one series of successive CU spatial divisions can be used to reach a given topology (i.e. set of block boundaries in a given picture area). Such method not only limits the RD search space on the encoder side, but also increases the coding efficiency of the codec, by making the decoder infer (dis-) allowed split modes during the split mode parsing process. In the following, this second type of combinatory reduction method is called topology redundancy reduction methods.

Another way for improving the speed up of the rate-distortion optimization performed at the encoder for finding the best split coding mode for a block is to predict the way the block will be split. Such a split prediction can be based for instance on a texture analysis of the block to encode. Such a texture analysis can use any method based on for instance texture variance, morphologic gradient, or activity level computed on the current block to encode.

Such a texture analysis may be used for analyzing a picture block to encode, and providing a prediction of the split modes that are likely to be used to compress that block with a video codec that would support a number of block split modes, as those previously introduced.

Basically, the output of such a framework, which is also an input to the coding parameter decision of the considered video encoder, takes the following form:

splitPred[s]∈{false,true},s∈{NO_SPLIT,QT_SPLIT, HOR,VER,HOR_TRIPLE, . . . ,VER_RIGHT}

In the following, the overall process that generates the above splitPred array of flags is called the texture-based split prediction. In the case where, splitPred[s]=true, the split mode s is likely to be used while in the case splitPred[s] =false, the mode s is likely not to be used.

Given this array of Boolean values, a straightforward adaptation of the encoder rate distortion optimized split mode selection consists in evaluating only the split modes whose corresponding splitPred value is equal to true.

However, this straightforward approach is not appropriate when used in an existing video encoder block partition RD search procedure, which already contains some non-normative and normative coding/decoding methods that limit the combinatory of a CTU's coding tree RD search as those discussed above.

In an embodiment, the split subset choice (splitPred) provided by a texture-based split prediction method is used together with already existing speed-up methods that limit the combinatory of the coding tree RD search.

In an embodiment, texture-based split prediction is exploited, while ensuring that the existing heuristic-based and normative constraints on split modes, which can be used for each CU, are used without any modification.

The advantage is that the resulting encoder split mode decision process is significantly accelerated by using the given texture-based split prediction. In the meantime, the heuristics-based and topology redundancy reduction methods are used without being modified. Thus, the encoding time is reduced in a cumulative way, respectively by the texture-based, heuristics based, and redundancy reduction based speed-ups. This acceleration can be obtained with limited loss in terms of coding efficiency, making the speed/compression trade-off attractive.

In the video encoder considered here, the coding tree search involves a recursive depth-first search process along an N-ary tree, where N represents the number of candidate partitions types considered in each node of the tree. This recursive search is combined with a multiple-loop process to determine the best combination of parameters to code each candidate CU in the tree.

Indeed, in the encoder considered here, multiple parameters are considered to compress each CU, and multiple embedded loops over these parameters are performed so as to determine the best combination of parameters to encode a CU.

A basic approach to use the texture-based split prediction provided by external means consists, at each node of the candidate coding tree, in considering only the split modes that are indicated as likely to be used for the split prediction modules.

This way, the whole number of split modes to evaluated in the RD search for a given CU sub-tree optimization is reduced.

However, such basic approach method is not able to cohabit with some other speed-up methods that may also exist in the considered video encoder. For example, a heuristic-based method may consist in not evaluating the NO_SPLIT mode, if the minimum CU depth among surrounding already coded CUs is higher than the depth of current CU. If it happens that the texture-based split prediction chooses the NO_SPLIT only for current CU, then the two RD search pruning methods are contradictory, thus cannot be used together.

A simple way to solve this problem is to de-activate all the heuristic-based speed-up methods contained in the encoder, and rely only on the texture-based split prediction to determine which candidate split modes to evaluate for a given CU. The drawback of such approach is that one only benefits from the texture-based block analysis module, in terms of combinatory limitation. Deactivating all other heuristic-based speed-ups brings some encoding time increase with poor compression performance improvements. Thus, it is not optimal in terms of trade-off between encoding time and compression performance.

Therefore, there is a need to define an encoding scheme wherein texture-based split prediction method and other speed-up methods are jointly used so as to decrease encoding time while keeping compression efficiency.

According to an embodiment, the set of split modes evaluated for a current CU based on the texture based split prediction is pruned in a way that cohabits efficiently with some speed-up methods existing in the considered video encoder. By efficiently, one means a good trade-off between encoding time and compression performance.

To do so, the proposed solution consists in detecting the cases where zero split mode may be evaluated for the current CU, if both the external split prediction and the encoder's heuristics based methods are applied.

In such case, since no split mode is to be evaluated for the CU, the encoder needs to force the usage of at least one split mode, otherwise the considered CU is not compressed and coded.

In that case, according to an embodiment, the use of split modes that are allowed by the heuristic-based methods is allowed, even if they are not selected by the texture-based split prediction module.

It happens that by giving priority to the heuristics based coder method over the choices given by the texture-based split prediction module, a good speed/compression efficiency trade-off is obtained.

According to another embodiment, the split modes chosen by the texture-based split prediction module are aligned with the normative policy that avoids redundancy between different successions of CU splits.

Indeed, this policy forbids the use of some split modes, given the set of successive spatial block divisions that led to the considered CU. If it happens that no split mode chosen by the texture-based split predictor is allowed, then the encoder must force the use of the non-chosen split mode to make sure the current CU is going to be coded. In that case, the invention proposes to force the evaluation of all of a part of the split modes that are allowed according to the non-redundancy normative policy.

Thus, priority is given to the non-redundant split mode policy, over the choice of split mode given by the texture-based split predictor.

Figure 9:
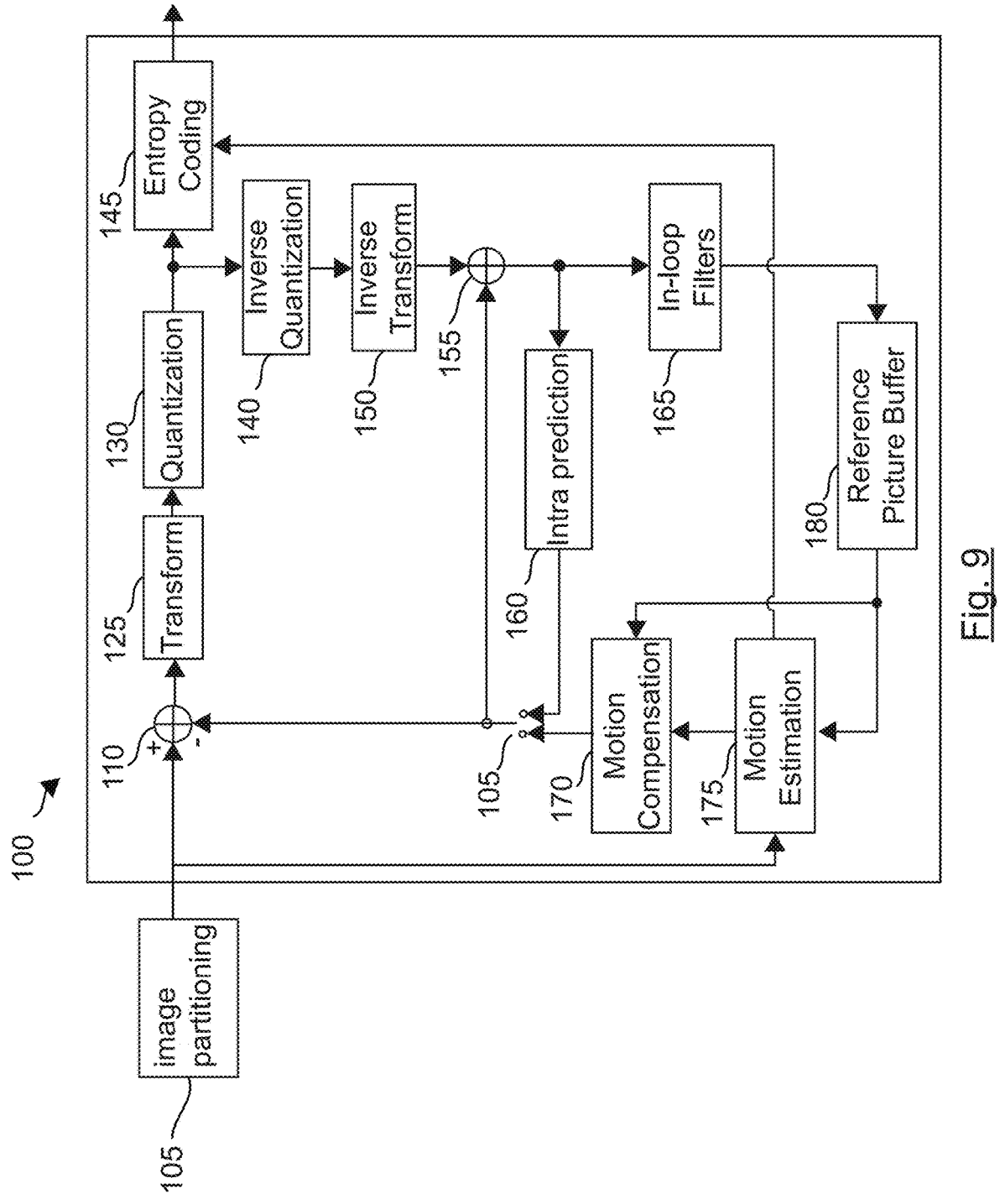
FIG. 9 shows an exemplary video encoder according to an embodiment.

FIG. 9 illustrates an exemplary video encoder 100 wherein an encoding method according to the any of the embodiments disclosed may be implemented. For instance, the exemplary video encoder 100 is an High Efficiency Video Coding (HEVC) encoder. HEVC is a compression standard developed by Joint Collaborative Team on Video Coding (JCT-VC) (see, e.g., "ITU-T H.265 TELECOMMU-NICATION STANDARDIZATION SECTOR OF ITU (10/2014), SERIES H: AUDIOVISUAL AND MULTIMEDIA SYSTEMS, Infrastructure of audiovisual services—Coding of moving video, High efficiency video coding, Recommendation ITU-T H.265").

The video encoder 100 encodes a video sequence with one or more pictures, a picture is partitioned into one or more slices where each slice can include one or more slice segments. A slice segment is organized into coding units, prediction units, and transform units.

In the present application, the terms "reconstructed" and "decoded" may be used interchangeably, the terms "encoded" or "coded" may be used interchangeable, and the terms "picture" and "frame" may be used interchangeably. Usually, but not necessarily, the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macro-block and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

CUs in intra mode are predicted from reconstructed neighboring samples within the same slice. For an inter CU, the corresponding coding block is further partitioned into one or more prediction blocks. Inter prediction is performed on the PB level, and the corresponding PU contains the information about how inter prediction is performed. The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied, and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

According to an embodiment, the encoding method with rate distortion optimization disclosed herein may be integrated in a video coder such as the encoder of FIG. 9.

Figure 10:
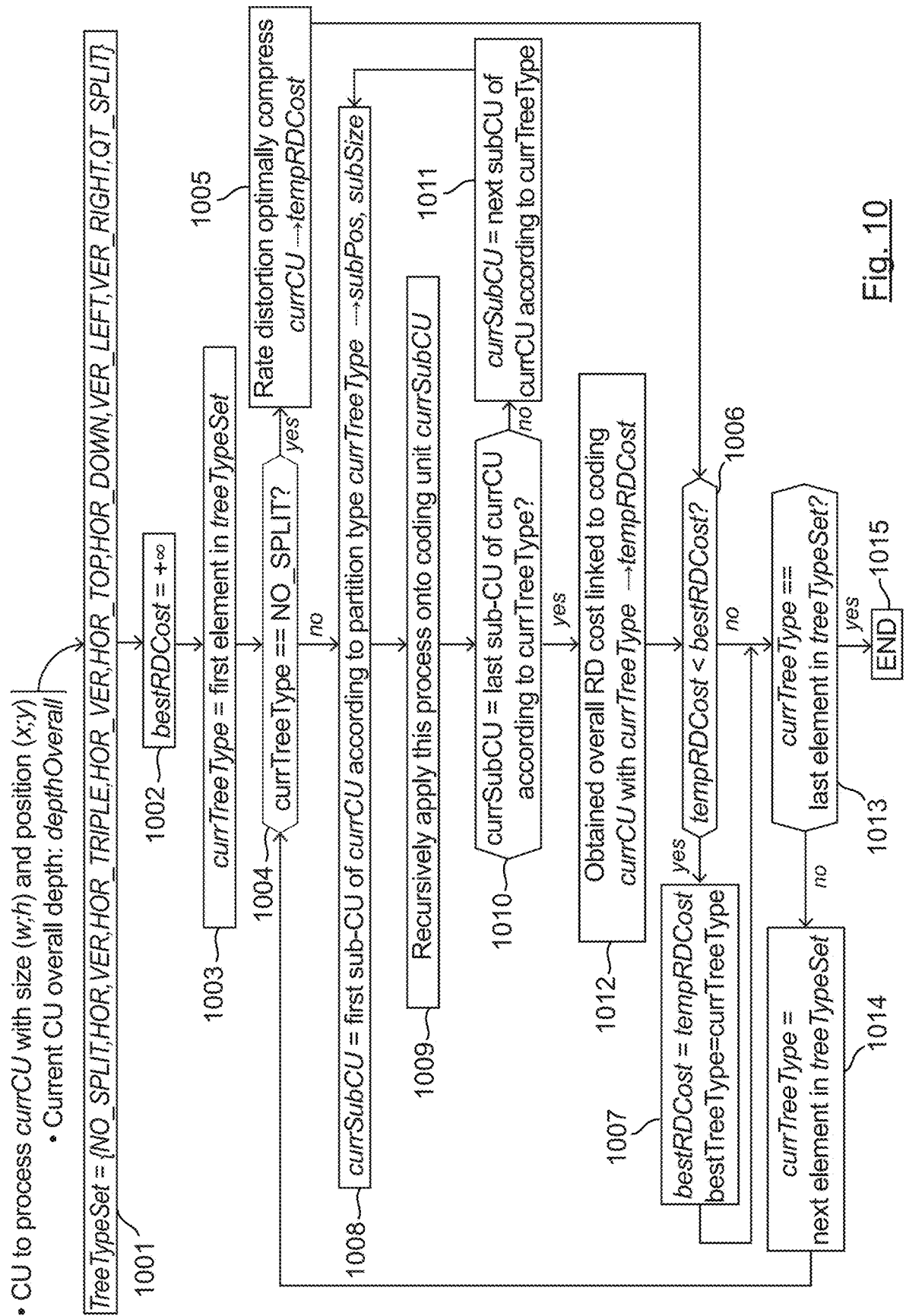
FIG. 10 shows an exemplary method for a rate distortion optimization for a given CU compression.

FIG. 10 shows a process for a rate distortion optimization for a given CU compression that can be used in the encoder 100. Note the CU may correspond to a CTU here (CU with maximum allowed size, typically 128×128 or 256×256).

As can be seen, the process consists in a global loop over all possible partition type allowed for current CU (TreeTypeSet in 1001). Note that according to the type (INTRA, INTER, etc), the size and the depth of the CU, only a subset of the split modes of set TreeTypeSet may be allowed. Note also that depending on the encoder configuration employed, some of the split modes in the set TreeTypeSet may also be deactivated. For instance, the HOR_TRIPLE and VER_TRIPLE split modes may be off. Or the HOR_TOP, HOR_DOWN, VER_LEFT and VER_RIGHT split modes may be off.

For a current CU, a bestRdCost value is first initialized at an infinite value (step 1002). The first split mode (step 1003) is then evaluated. At step 1004, it is checked whether the split mode evaluated for the current CU is the mode NO_SPLIT. If the split mode is NO_SPLIT, then the RD optimal coding parameters for current CU are being determined at step 1005. This results in a rate distortion cost tempRDCost, which is compared to a current bestRdCost value at step 1006. If the rate distortion cost tempRDCost is lower than the current best RdCost value, then at step 1007, the evaluated split mode become the best split mode found so far, and tempRdCost is stored as the lowest RD cost found so far.

In the case where, at step 1004, the current candidate split mode is different from the mode NO_SPLIT, this means the division of the current CU into at least 2 sub-CU is being considered. At step 1008, this spatial partitioning of currCU is performed, and a loop over each sub-CU, noted currSubCU, is performed. For each sub-CU, the overall process of FIG. 10 is invoked in a recursive way at step 1009, with the sub-CU as the input. At step 1010, it is checked whether the loop over the sub-CU is done. If the loop over the sub-CU is not finished, at step 1011, the process passes to the next sub-CU of the current CU and the overall process of FIG. 10 is invoked in a recursive way at step 1009.

Once the loop over the sub-CUs is done, at step 1012, the RD cost associated with the current split mode currTreeType of the current CU can be computed, as the sum of the best RD cost of each sub CU, plus the cost related to the signaling of the current split mode currTreeType. This resulting RD cost is noted tempRdCost and is compared at step 1006 to the lowest RD cost found so far best RdCost. In case it is lower, then at step 1007 the current split mode is stored as the best split mode found so far, and best RdCost takes the value tempRdCost.

At step 1013, it is checked whether the loop over all candidate split modes for the current CU is done. If no, at step 1014, the process passes to the next candidate split mode to be evaluated in the TreeTypeSet. Once the loop over all candidate split modes is done, then the process of FIG. 10 is over (step 1015).

As a result, to perform the RD optimal compression of a given CTU, the process of FIG. 10 is invoked with the considered CTU as the input.

One sees the RD optimization process for a CTU involves a recursive depth-first tree search process, which overall combinatory highly depends on the number of candidate split modes being evaluated at each stage (node) of the coding tree search process.

Moreover, in case of the split mode NO_SPLIT, the rate distortion process determines the set of optimal coding parameters for the compression of the considered coding unit.

This CU-level rate distortion optimization process involves a high number of embedded loops over all candidates coding parameters, for determining the best tuple of multiple coding parameters for a specific partition of a block. Consequently, the overall decision process of FIG. 10 is of high combinatory not only for the tree search process, but also on the block coding level, thus is highly complex.

Figure 11:
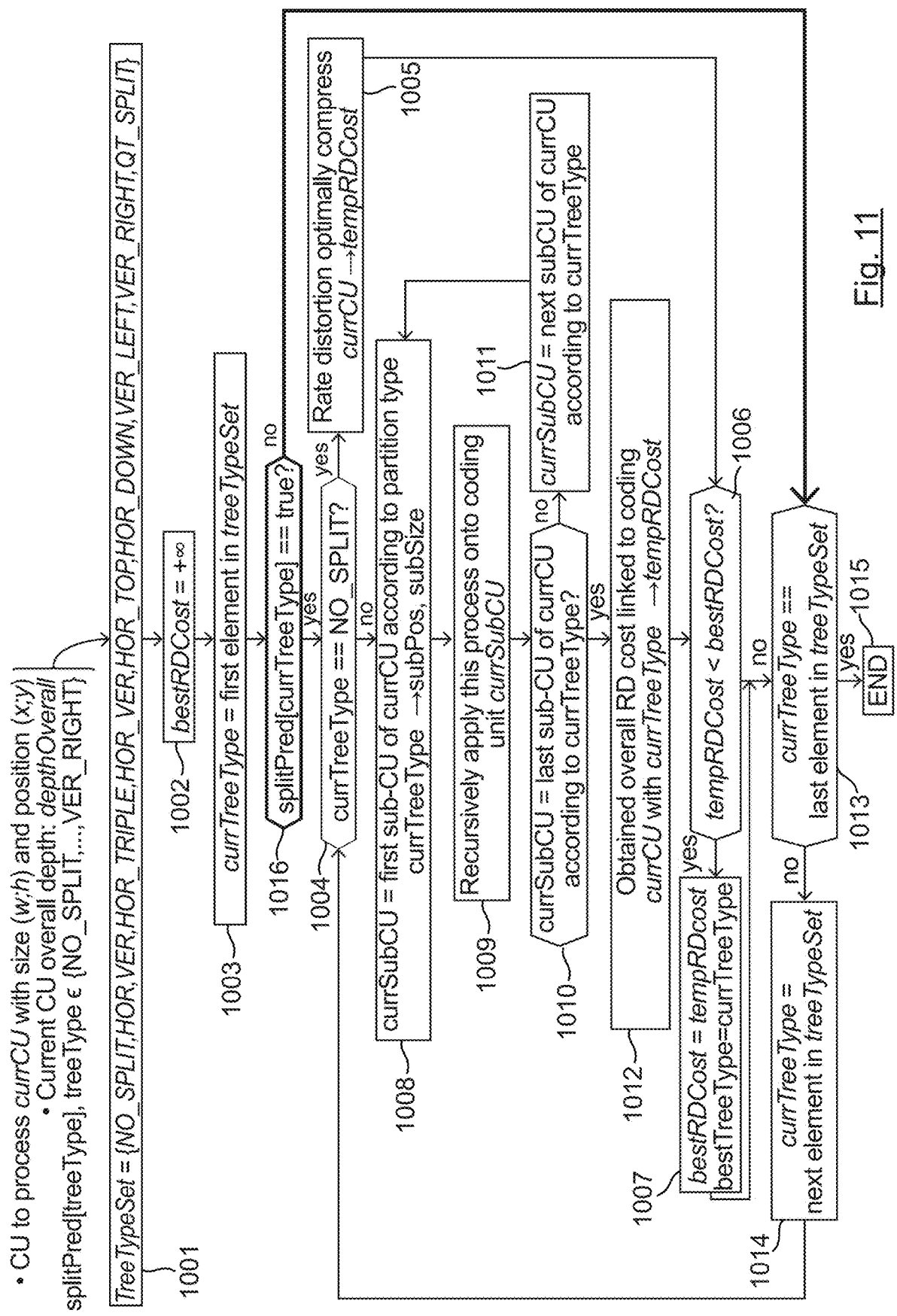
FIG. 11 shows an exemplary method for a rate distortion optimization for a given CU compression wherein texture-based split prediction set is used.

FIG. 11 shows the Rate Distortion optimization process of FIG. 10 modified so as to take into account the split mode(s) chosen by a texture-based split prediction module discussed above. A step 1016 is added to the Rate Distortion optimization process of FIG. 10. Step 1016 consists in testing, for each candidate split mode of a current CU, if the texture-based split prediction process indicates that the considered split mode should be used for the current CU, i.e. if splitPred[s] is equal to true.

If no, then the rate distortion evaluation of the candidate split mode is by-passed (steps 1004-1012 are by-passed) and the algorithm directly iterates on the next split mode candidate in the set TreeTypeSet (step 1013). Otherwise, the unchanged rate distortion cost associated with the candidate split mode is performed in the same way as in FIG. 10.

Figures 12, 12A, 12B:
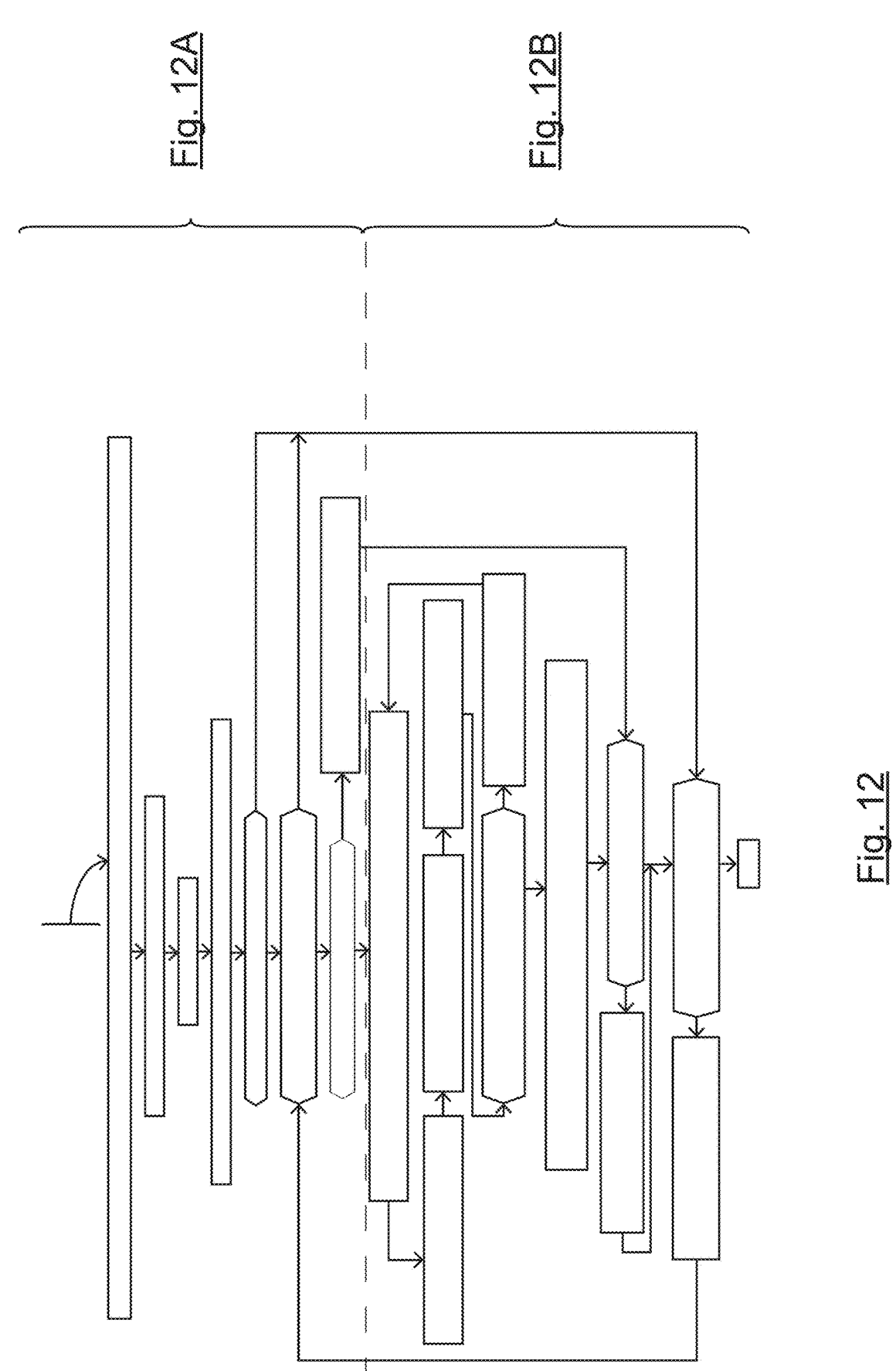
FIG. 12 is an overview of FIGS. 12A and 12B which are presented on separate pages, the top part of FIG. 12 (above the dashed line) is disclosed on FIG. 12A, and the lower part of FIG. 12 (below the dashed line) is disclosed on FIG. 12B.
FIGS. 12A and 12B illustrate an exemplary rate distortion process wherein a texture-based split prediction set is used in combination with other methods used for combinatory split mode reduction.
Figure 12A:
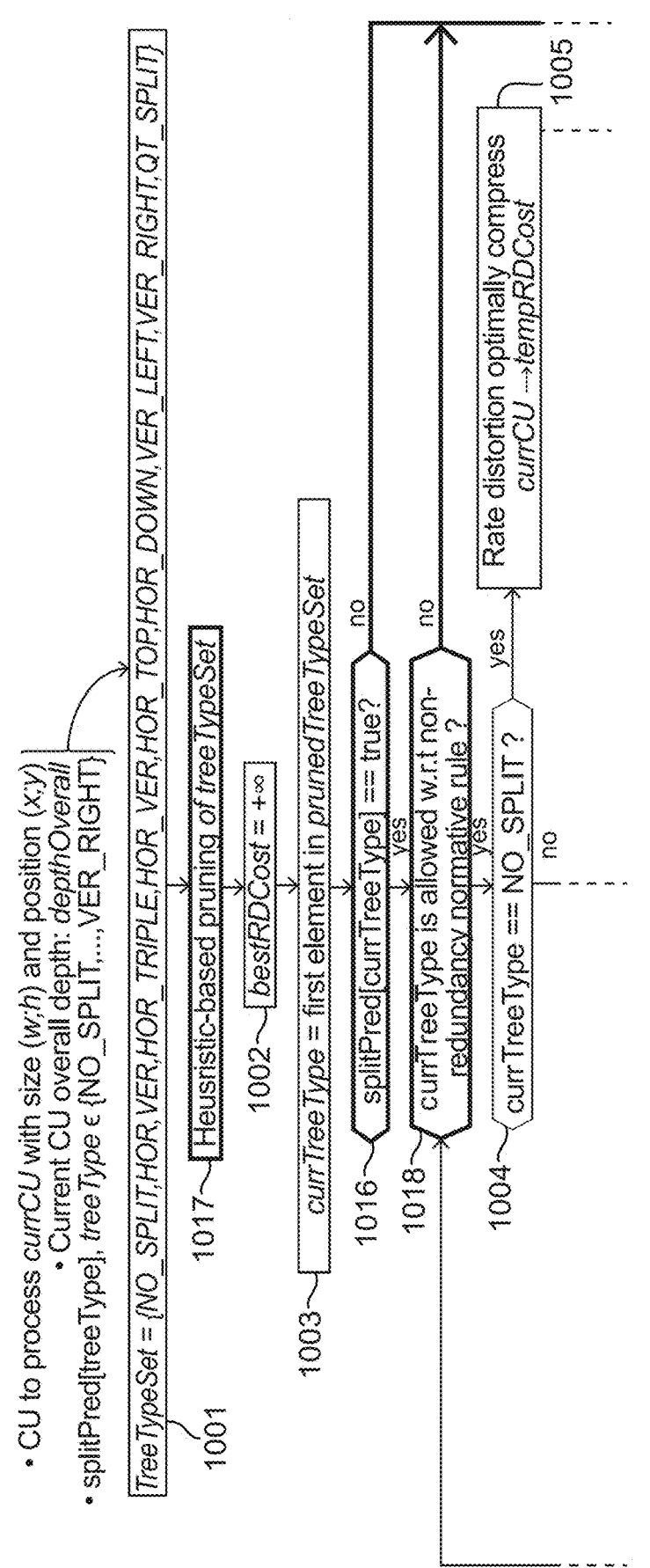
Figure 12B:
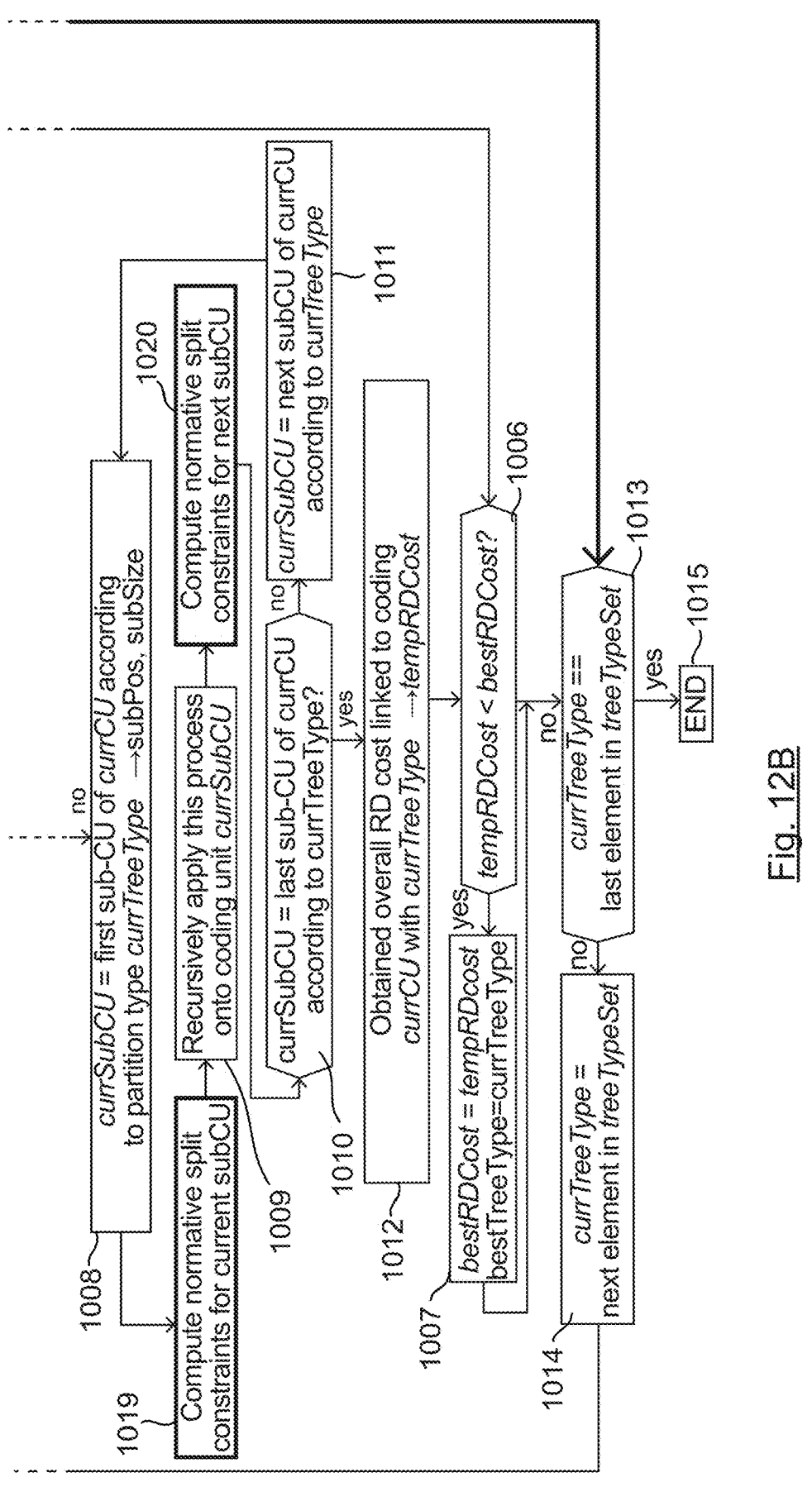

FIGS. 12A and 12B illustrate an exemplary Rate Distortion optimization process wherein a texture-based split prediction set is used in combination with other methods used for combinatory reduction.

Figure 13:
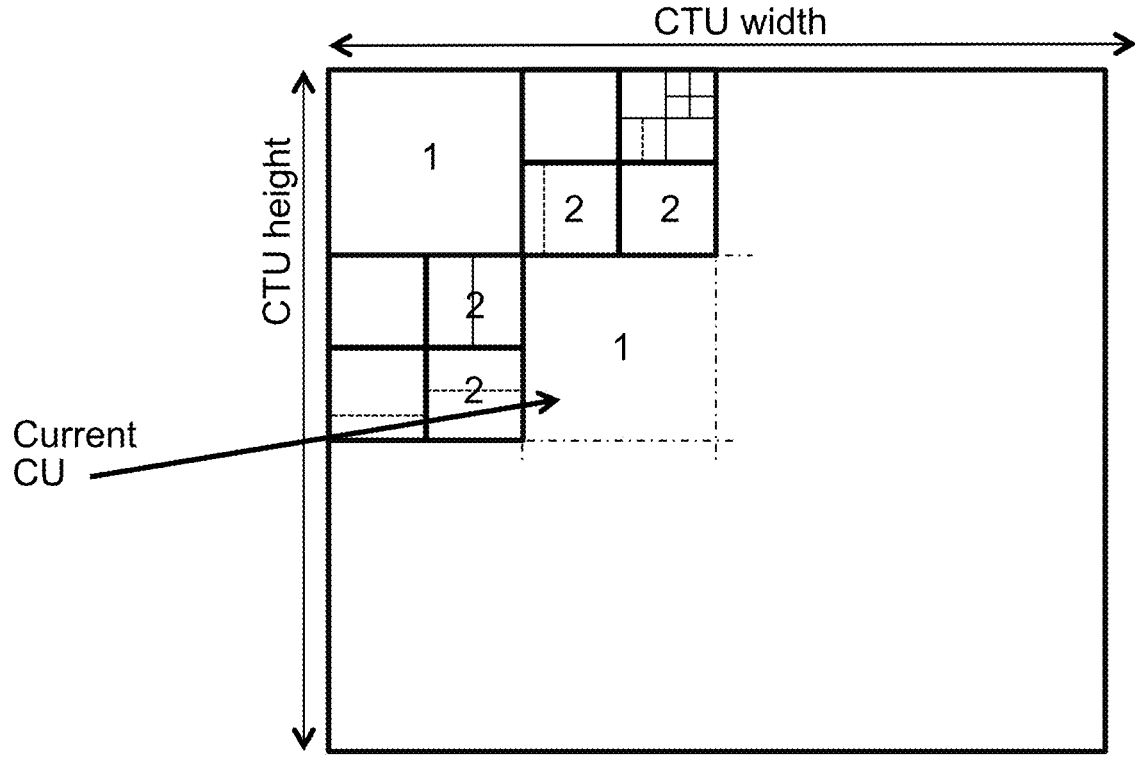
FIG. 13 illustrates Quad-Tree depth of coding units according to a splitting configuration of the CTU.
Figure 14:
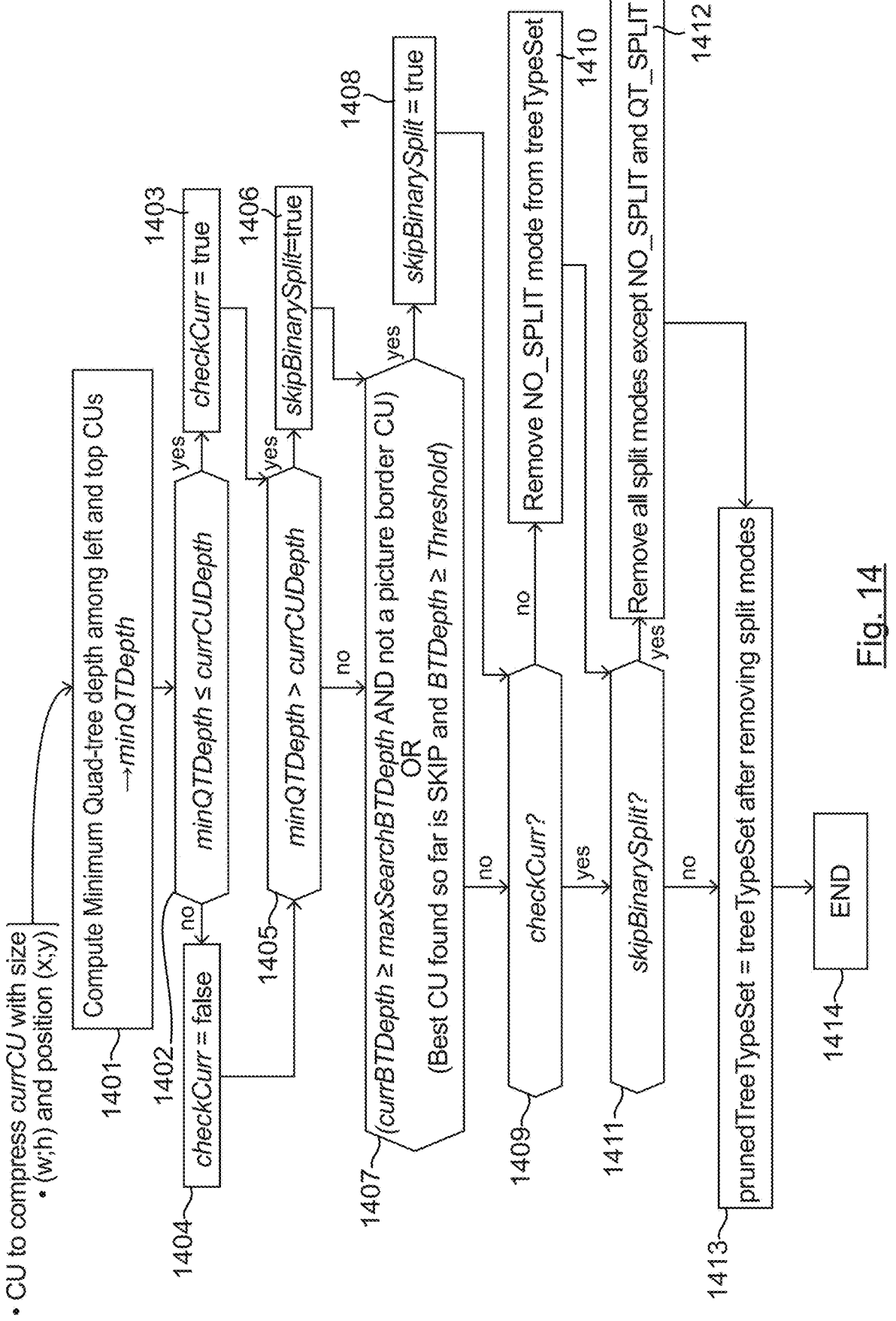
FIG. 14 shows an exemplary method for heuristic-based combinatory reduction.

In FIGS. 12A and 12B, heuristic-based methods are invoked in order to prune the set of split modes that are to be evaluated for a given CU. Such pruning takes place at step 1017 before the loop over all candidate split modes. An exemplary heuristic-based pruning mechanism is illustrated by FIGS. 13 and 14 discussed below.

Also, in FIGS. 12A and 12B, another type of combinatory reduction mechanism that interacts with the split prediction choices in the process of FIG. 11 is disclosed. Such a combinatory reduction mechanism corresponds to the normative constraints that are imposed onto the usage of various split modes to encode and decode a Coding Unit. These normative constraints are further discussed below with FIGS. 16 and 17. Such constraints are taken into account at various stage of the Rate Distortion optimized coding tree search of FIG. 11.

Indeed, before processing a given sub-CU during the loop over sub-CUs of current CU that takes place according to a current split mode being evaluated currTree Type, the normative redundancy constraints are computed at step 1019 for the current subCU that is going to be evaluated and at step 1020 when the next subCU is going to be evaluated. Such normative redundancy constraints are computed in order to forbid the use of some split modes in the next sub-CU to process.

Such forbidding process ensures that the block division that may result from the RDO process can be obtained through a unique series of successive splitting operations.

During the evaluation of the split modes for a current CU or subCU, at step 1018, it is verified whether the currTree Type that is going to be evaluated for the current CU or subCU is allowed with regards to the normative redundancy constraints.

At step 1018, if the current split mode is not allowed, then the evaluation of the current split mode for the current CU or subCU is by-passed and the process goes directly to step 1013 and passes to the evaluation of the next split mode for the current CU or subCU.

The normative redundancy constraints allow both speeding-up the encoder side RD search and improving the overall coding efficiency. Indeed, these constraints are imposed in a normative way, which means the encoder and the decoder both compute the allowed and forbidden split modes at any stage of the recursive spatial block division process. This way the decoder can infer a part of the splitting configuration, which reduces the amount of signaling that needs to be transmitted in the bit-stream.

A heuristic-based split mode set tuning method is now discussed. The basic principle of these heuristics is that the Quad-tree depth (noted QT depth) of a current CU to encode is likely to be correlated to the quad-tree depth of already coded neighboring CUs. The quad-tree depth of a current CU is defined as representing the number of successive quad-tree splits for obtaining this CU. The quad-tree depth may be different from the overall depth which represents the number of total successive splits for obtaining this CU. This is illustrated on FIG. 13, where the QT depths of surrounding CUs are equal to 2 and the QT depth of the current CU being processed is 1. A heuristic-based split mode set tuning method is illustrated in FIG. 14.

At step 1401, a minimum QT depth among the top, top-right, left and bottom-left neighboring CUs of current CU is computed. At step 1402, it is checked whether the minimum QT depth of top- and left-neighboring CUs of current CU is less or equal to current CU's QT depth. If the minimum QT depth of top- and left-neighboring CUs of current CU is less or equal to current CU's QT depth, then at step 1403, the NO_SPLIT split mode is allowed for current CU by setting a boolean value CheckCurr to true. Otherwise it is not considered, by setting at step 1404, the boolean value CheckCurr to false.

At step 1405, it is checked whether the minimum QT depth of top- and left-neighboring CUs of current CU is strictly higher than current CU's QT depth. If the minimum QT depth of top- and left-neighboring CUs of current CU is strictly higher than the current CU's QT depth, then the triple and binary split modes are not allowed for current CU by setting at step 1406 a boolean value SkipBinarySplit to true.

According to an embodiment, the min QT depth used in the above process is the minimum Region Tree Depth of the top, top-right, left and bottom left neighboring CUs, decremented by a fixed value, for example 1.

Additionally, another heuristic aims at limiting the testing of binary and triple split modes, according to the binary tree depth of current CU and the best coding found so far for current CU.

Indeed, a maximum binary tree search depth (maxSearch-BTDepth) is fixed for each Quad-tree depth, to maintain the overall combinatory not too high. Typically, this maximum Binary Tree depth is equal to 3 for QT depth levels higher or equal to 2, and is equal to 0 for quad-tree depths 0 and 1. This is in line with the QTBT architecture illustrated on FIG. 4 and the fact that good coding efficiency is obtained through the use of QT_SPLIT mode for large blocks (128 or 64).

Thus, at step 1407, it is checked whether the BT depth of current CU is higher or equal to the maximum BT depth allowed for current CU QT depth and the current CU is not a CU at a border of the picture. If the BT depth of current CU is higher or equal to the maximum BT depth allowed for current CU QT depth, then no triple or binary split mode is evaluated for current CU by setting at step 1408 the boolean value skipBinarySplit to true.

At step 1407, it is also checked whether the best mode found so far for current CU by the RDO process is in skip mode, and if the current CU's BT depth is at least equal to a fixed threshold. In that case, the evaluation of triple and binary split modes for current CU is forbidden by setting at step 1408 the boolean value skipBinarySplit to true.

Then, at step 1409, the boolean value checkCurr is checked. If the boolean value checkCurr is not true, then at step 1410, the NO_SPLIT mode is removed from the treeTypeSet.

At step 1411, the boolean value skipBinarySplit is checked. If the boolean value skipBinarySplit is true, then at step 1412, all split modes are removed from the treeTypeSet, except for the modes NO_SPLIT and QT_SPLIT.

At step 1413, the pruned treeTypeSet is stored in a prunedTreeTypeSet table and the process ends (step 1414).

The issue of using these heuristics in combination with the texture-based split prediction is that this may lead to zero split mode allowed for a given CU. This is not acceptable, because ultimately this may lead to situations where no mode is evaluated for a part of the picture to code.

In some other cases, these heuristics badly interact with the texture split mode prediction even if all blocks are being encoded.

On the other hand, the heuristic-based methods explained here are quite efficient in reducing the encoder complexity, while preserving good coding efficiency.

Therefore, a policy to efficiently use the texture-based split prediction is needed.

The normative redundancy constraints are discussed below with FIGS. 15 and 16. These normative constraints are used to limit the set of triple and binary split mode allowed for a given CU, previously introduced. These constraints are used to avoid the possibility to reach a given block division of a spatial area through two different paths of the candidate coding tree.

Figure 15:
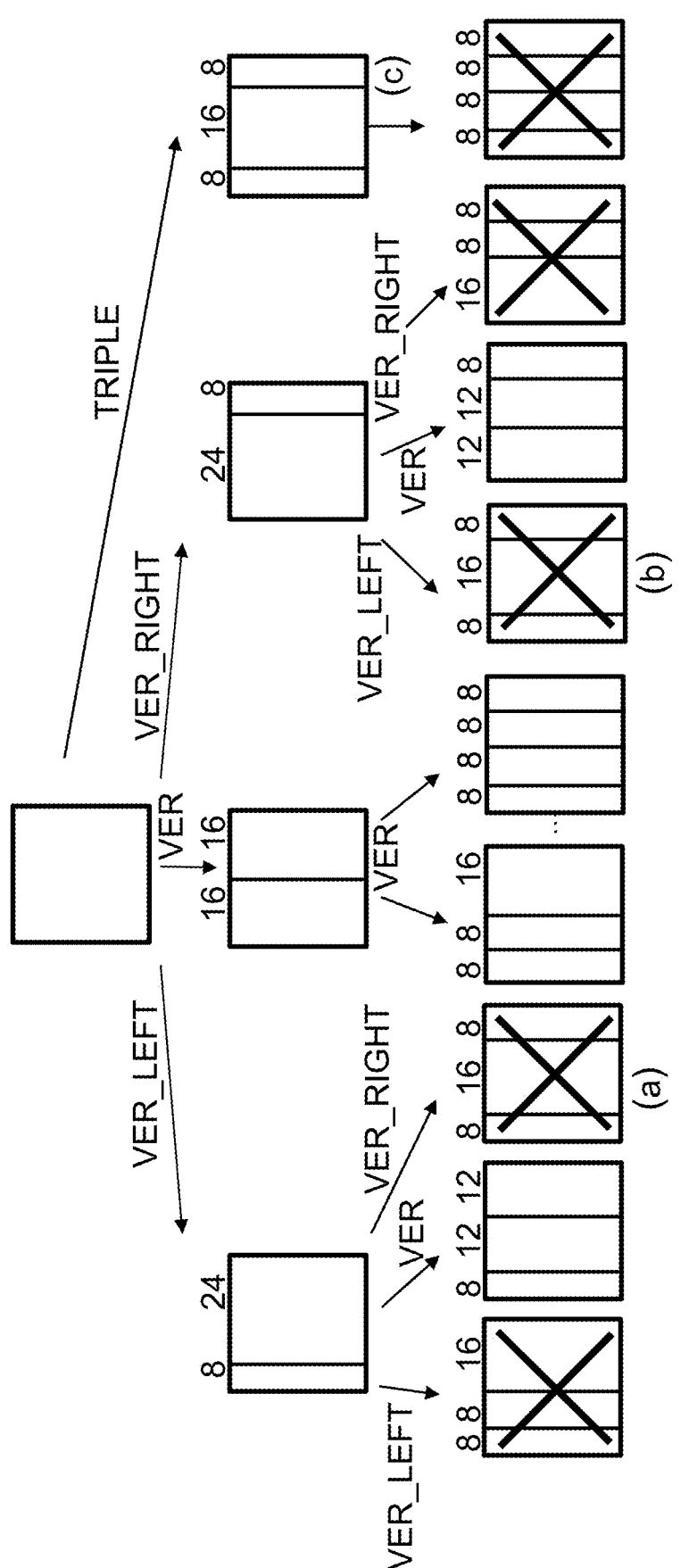
FIG. 15 illustrates exemplary normative redundancy constraints on the use of binary and triple split modes.
Figures 16, 17:
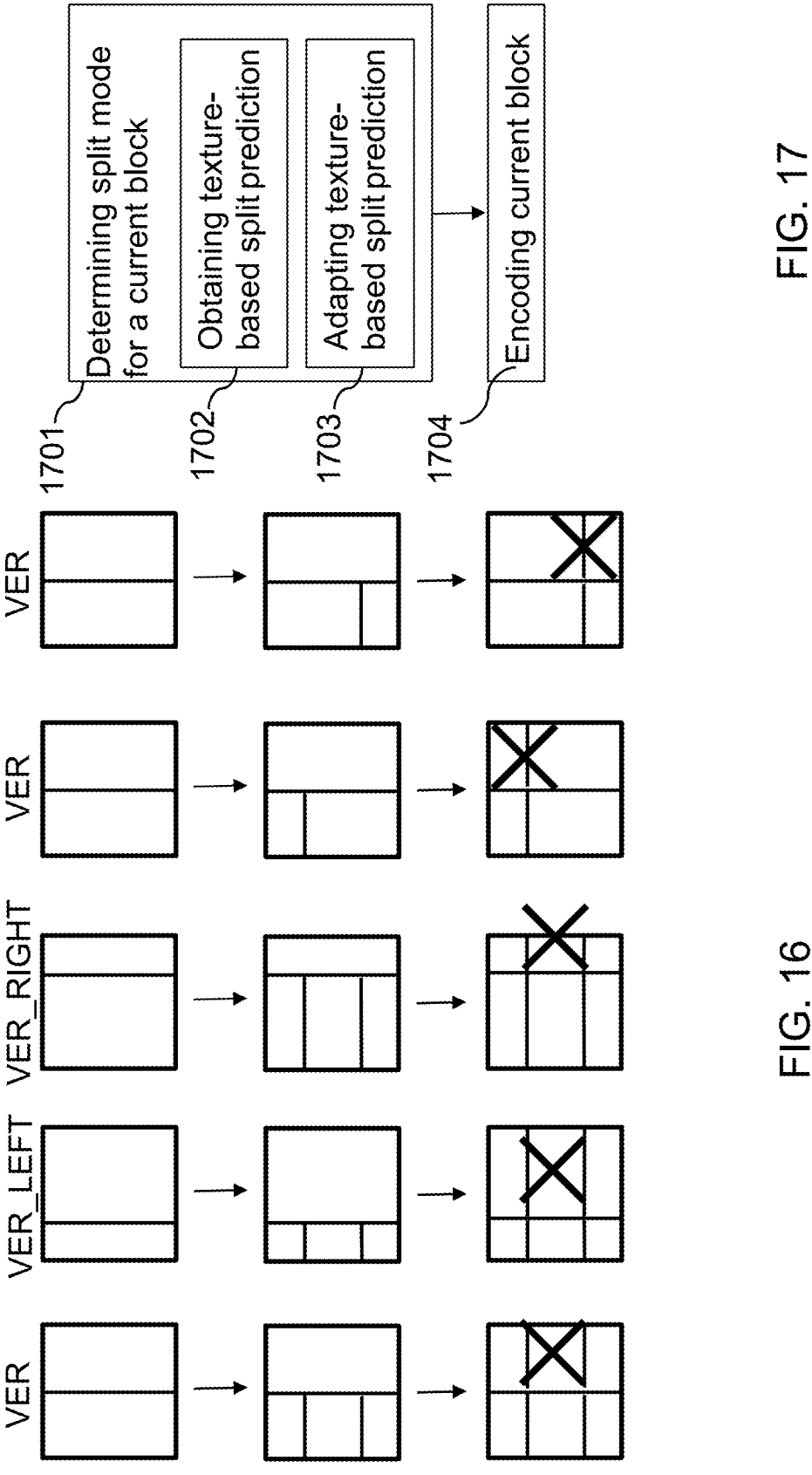
FIG. 16 illustrates exemplary normative redundancy constraints on the use of asymmetric binary split modes.
FIG. 17 illustrates an exemplary method for encoding a picture block according to an embodiment.

Some successions of split modes are thus forbidden, as illustrated by FIGS. 15 and 16. As an example, it is forbidden to emulate a topology that can be used with only binary tree, by using successive triple or asymmetric splits. FIG. 15 illustrates forbidden splitting (indicated by cross lines) in the case of successive vertical splitting of subCU. Corresponding forbidden splitting also exists in the case of successive horizontal splitting. FIG. 16 illustrates examples of forbidden splitting in the case of vertical splitting followed by horizontal splitting.

For instance, as illustrated on FIG. 15, the splitting of a CU into three vertical CU or width 8-16 and 8, also known as TRIPLE split, may be obtained through:

(a) a first vertical left splitting of a square CU followed by a vertical right splitting of the right subCU, or (b) a first vertical right splitting of a square CU followed by a vertical left splitting of the left subCU, (c) a vertical triple splitting of the square CU.

According to the normative constraints, only the configuration (c) is allowed in that case. Configuration (a) and (b) are forbidden. That is, in the case of (a), when evaluating the split modes for the right subCU resulting from the vertical left splitting of the square CU, the split mode binary vertical right is not allowed. In the case of (b), when evaluating the split modes for the left subCU resulting from the vertical right splitting of the square CU, the split mode binary vertical left is not allowed.

Such constraints imposed onto the triple and binary split mode usage may lead to non-valid situations when combined with the texture-based split prediction. Indeed, if the texture-based split prediction chooses some split modes for a given CU, but those split modes are forbidden by the normative non-emulation policy, then the encoder reaches a state where the considered CU cannot be encoded.

Ultimately this may lead to a situation where a part of the picture is not encoded at all, which is not acceptable.

Therefore, a policy is needed to jointly use the normative anti-emulation policy and the texture-based split prediction in an efficient way, and which avoids any non-valid situation.

According to an embodiment, a method for encoding a block is disclosed with reference to FIG. 17.

In step 1701, a split mode is determined for a current block to encode. For instance, the split mode is determined based on a rate-distortion optimization performed in a recursive manner as discussed previously.

According to the embodiment disclosed herein, at step 1702, texture-based split prediction is obtained for the current block. The current block may be a coding unit to encode or a sub coding unit resulting from a splitting of the previous coding unit or sub coding unit in the rate distortion optimization. Therefore, texture-based split prediction is obtained for the block according to the depth of the block in the coding tree.

As discussed above, texture-based split prediction may be obtained by an analysis of the texture of the block. Such texture analysis may be performed by computing the variance of the texture at each point of the coding unit, or the level of activity, or morphological gradients, or any other methods for texture analysis. Texture analysis and texture-based split prediction are performed by an external module.

The external module outputs for a given coding unit or sub coding unit a texture-based split prediction set. Such a texture-based split prediction set associated with a given coding unit or sub coding unit is an array storing, for each split mode, a boolean value indicating whether or not the split mode is likely to be chosen for encoding the given coding unit or sub coding unit.

If the boolean value for a split mode is set to true, then the split mode is allowed for encoding the given coding unit or sub coding unit. A texture-based split prediction set is provided for the coding unit and each sub coding unit of the coding tree for coding the current CU. Therefore, as the rate-distortion optimization is performed in a recursive way, the texture-based split prediction set has to be obtained for each sub coding unit to is going to be evaluated.

At step 1703, the texture-based split prediction set is adapted according to the normative non-redundancy constraint discussed above or the heuristic-based split mode set pruning discussed above, or according to both. Such adaptation is further discussed below in reference with FIG. 18.

At step 1704, the current block is encoded using the split mode determined previously. For instance, the encoder discussed with FIG. 9 may be used.

Figure 18:
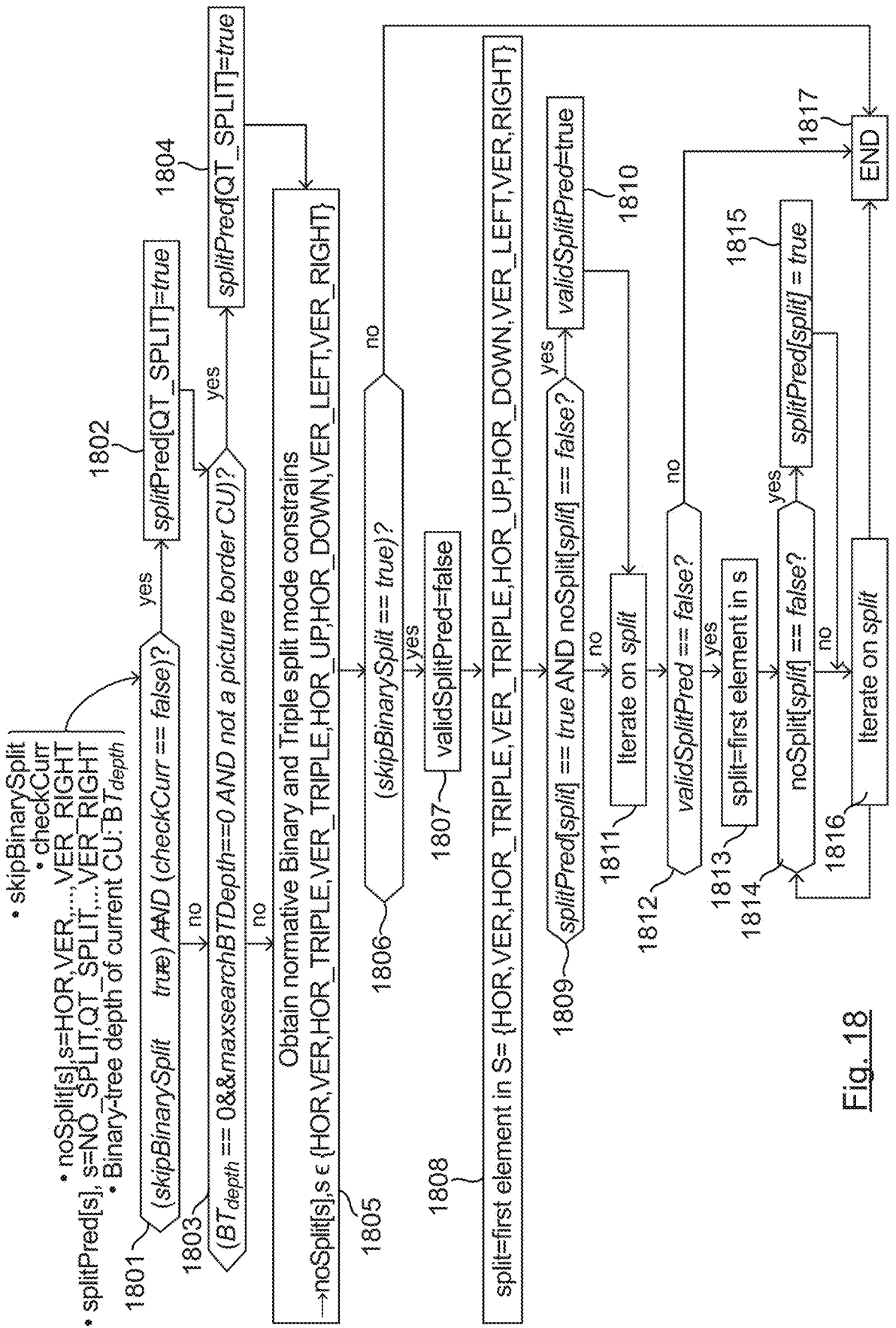
FIG. 18 illustrates an exemplary method for adapting the texture-based split prediction set to heuristics and normative constraints according to an embodiment.

FIG. 18 illustrates an exemplary method for adapting the result of the texture-based split prediction to heuristics and normative constraints described above.

The input to the process are the following ones:

The split choices provided by a texture-based split prediction step. Such split choices are for instance stored in an array splitPred[s], with s=NO_SPLIT, QT_SPLIT, . . . , VER_RIGHT. If, for a given split mode s, the Boolean value splitPred[s] is equal to true, then the split mode s has to be evaluated for the current CU according to the split prediction step.

The normative constraints imposed on the usage of binary and triple split modes. Such constraints are stored for instance in an array noSplit[s], with s=HOR, VER, . . . , VER_RIGHT. If, for a given split mode s, the Boolean value noSplit[s] is equal to true, then the split mode s cannot be used for current CU.

The results from the heuristics computed by the process discussed with FIG. 14. Such results are provided by the boolean values set in the process of FIG. 14: skipBinarySplit, checkCurr.

The binary-tree depth of current CU noted $BT_{depth}$.

At step 1801, it is tested if the skipBinarySplit is equal to true and if the checkCurr flag is equal to false. If so, then at step 1802, the flag splitPred[QT_SPLIT] is set to true, even if the texture-based split prediction indicates QT_SPLIT should not be used for the current CU. In other words, the QT_SPLIT mode is forced to be evaluated for the current CU.

At step 1803, it is tested if the RD search configuration is such that the binary split modes will not be tested for current CU. This is the case if $BT_{depth}$ is equal to zero, and the maximum BT search depth is typically equal to zero for some (low) quad-tree depth levels and if current CU is not located at the border of the picture.

If the test at step 1803 is positive, then at step 1804, the flag splitPred[QT_SPLIT] is set to true, to ensure at least one split mode is going to be tested for the current CU. In other words, at step 1804, the QT_SPLIT mode is forced to be evaluated for the current CU.

Indeed, such case happens typically for large CUs, hence to ensure a good coding efficiency, enable at least the QT_SPLIT is required for such block size.

If the test at step 1803 is negative, the process passes to step 1805. At step 1805, normative binary and triple split mode constraints are obtained for the current CU and stored in the array noSplit.

At step 1806, it is tested if the boolean skipBinarySplit is equal to true, which means binary and triple split modes are to be evaluated for the current CU. If the boolean value skipBinarySplit is false, the process ends at step 1817.

Otherwise, the process then continues by verifying if the decisions of the splitPred[.] array are compliant with the normative constraints on the binary and triple split modes for the current CU.

At step 1807, a boolean value validSplitPred is set to false.

The process loops over all binary and triple split modes (step 1808) for verifying if at least one binary or triple split mode is going to be evaluated, based on the splitPred[.] and noSplit[.] arrays.

At step 1809, it is tested if at least one split mode split is such that splitPred[split] is true and noSplit[split] is false, then the boolean value validSplitPred is set to true at step 1810. In other words, at least one binary or triple split mode allowed by the texture-based split prediction is valid in respect of the normative binary and triple split mode constraints.

If the test at step 1809 is positive, then nothing more has to be done, since the splitPred[.] content is not colliding with the noSplit[.] array.

If the test at step 1809 is negative, then the loop iterates on the next split mode among the binary and triple split mode (step 1811).

Once all the binary and triple split modes have been checked, at step 1812, it is verified if the boolean validSplitPred is false. In other words, it is verified of at least one binary or triple split mode allowed by the texture-based split prediction is valid in respect of the normative binary and triple split mode constraints.

If the test at 1812 is negative, that is at least one binary or triple split mode allowed by the texture-based split prediction is valid in respect of the normative binary and triple split mode constraints, the process ends (step 1817).

If the test at 1812 is positive, it means no triple or binary split is about to be evaluated for the current CU. This may lead to a non-valid state in the encoder, i.e. a spatial part of the picture which is not encoded at all.

Therefore, if the test at 1812 is positive, that is there is no valid binary or triple split mode allowed by the texture-based split prediction in respect of the normative binary and triple split mode constraints, then the process loops (1813, 1816) over all binary and triple split modes and checks (step 1814) if the split mode is allowed by the normative binary and triple split mode constraints, that is if the value of the array noSplit for the current split mode is false.

If the split mode is allowed, then the value in the texture-based split prediction set for the split mode is set to true (step 1815). In other words, according to this embodiment, all binary and triple split mode allowed by the normative constraints for the current CU are forced to be evaluated in the Rate-distortion optimization process.

According to another embodiment, only the binary or triple split mode that is first encountered in the binary and triple split mode texture-based split prediction table is forced to be evaluated in the rate-distortion optimization. That is only the boolean value splitPred for the binary or triple split mode that is first encountered in the texture-based split prediction table which is allowed by the normative constraints is set to true.

According to another embodiment, at least a horizontal binary or triple split mode and a vertical binary or triple split mode that are first encountered in the texture-based split prediction set are forced to be evaluated in the rate-distortion optimization. That is the boolean value splitPred for the horizontal binary or triple split mode and the vertical binary or triple split mode that are first encountered in the texture-based split prediction set which are allowed by the normative constraints are set to true.

According to an embodiment, the process disclosed in FIG. 18 is used in the process of FIGS. 12A and 12B.

Figures 19, 19A, 19B:
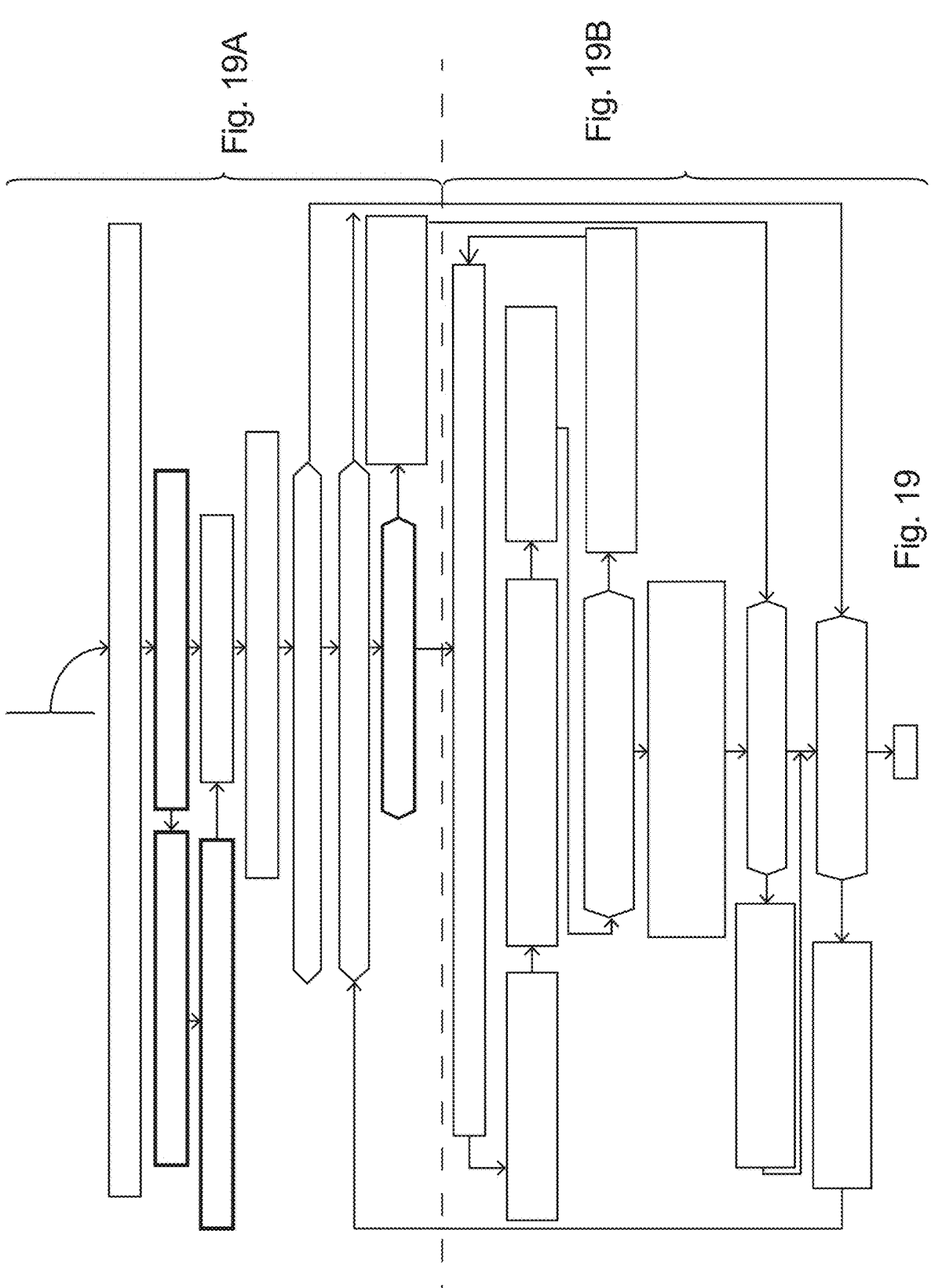
FIG. 19 is an overview of FIGS. 19A and 19B which are presented on separate pages, the top part of FIG. 19 (above the dashed line) is disclosed on FIG. 19, and the lower part of FIG. 19 (below the dashed line) is disclosed on FIG. 19B.
FIGS. 19A and 19B show an exemplary method for a rate distortion optimization for a given CU compression according to an embodiment.
Figure 19A:
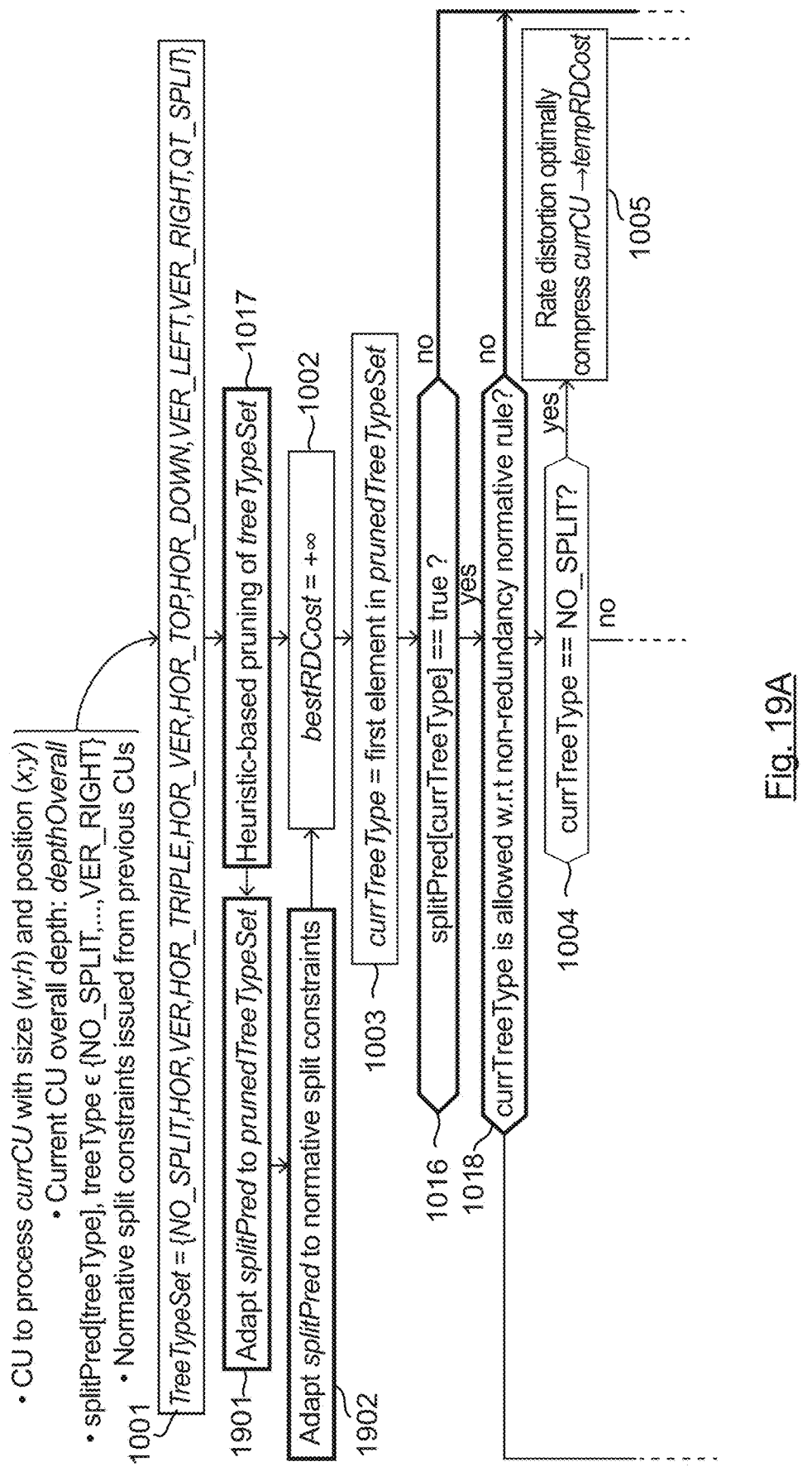
Figure 19B:
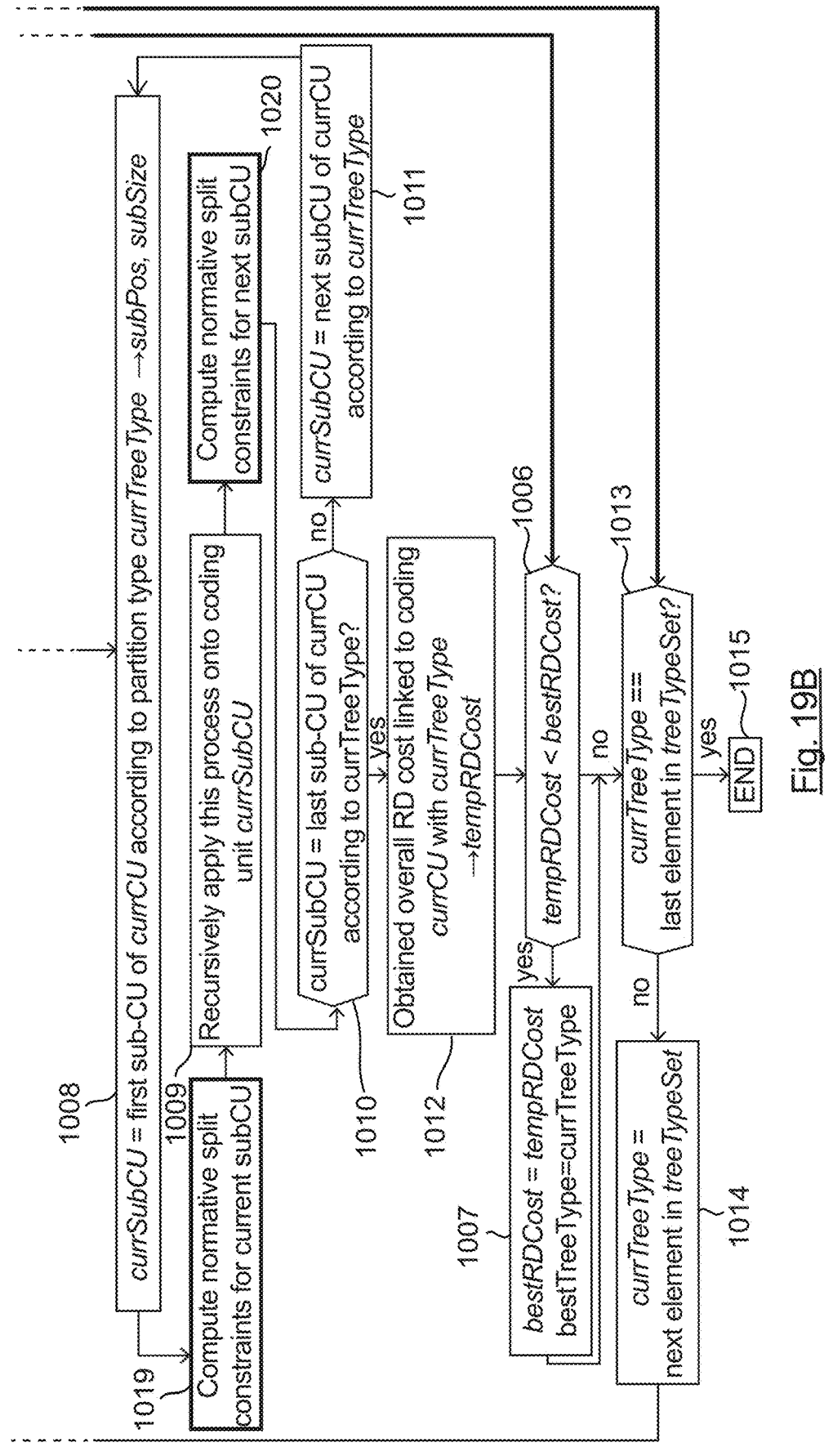

An exemplary method using the method disclosed with FIG. 18 is illustrated by FIGS. 19A and 19B. In this embodiment, steps 1901 and 1902 are added to the overall RD optimized coding tree search process.

Step 1901 is performed after the heuristic-based pruning method disclosed with FIG. 14. Step 1901 allows adapting the texture-based split prediction set according to heuristic-based pruning set. For instance, step 1901 comprises steps 1801 through 1804 disclosed with FIG. 18.

Step 1902 is performed before the rate-distortion optimization for the current CU or sub CU. Step 1902 allows adapting the texture-based split prediction set according to the binary and triple split mode normative constraints. For instance, step 1902 comprises steps 1805 through 1816 disclosed with FIG. 18.

These two steps aim at making the use of the texture-based split prediction cohabit efficiently with the heuristic based coding tree pruning process and the normative constraints used to limit the amount of binary and triple split modes allowed for a CU.

The goal is to benefit from the texture-based split prediction as much as possible in terms of RD search speed-up, while keeping the benefit of these already existing combinatory limiting methods.

Indeed, an alternative solution may consist in deactivating some heuristic-based speed-ups for instance, but it has been observed that by de-activating the heuristics described previously, a less interesting trade-off is obtained between speed and performances: the coding time is increased with very little coding efficiency improvement.

Moreover, modifying the normative constraints on the BT split modes usage is not desirable, because it would lead also to a loss in coding efficiency. Indeed, split configuration would be possible on the decoder side, which would lead to the transmission of more syntax elements in the coded bit-stream.

According to another embodiment, only step 1901 or step 1902 may be performed. In that case, only steps 1801-1804 or steps 1805-1816 may be performed.

According to another embodiment, some encoder choice caching mechanisms may be used in the rate distortion optimization process. An example of such an encoder choice caching process is described in the international application PCT/EP2017/071844 filed in Aug. 31, 2017.

This process consists in re-using the coder's choices determined by the Rate Distortion Optimization process, in case the current block size, position and causal environment has already been processed in the past by the overall coding tree search process of FIG. 19. For instance, this happens when testing the asymmetric HOR_UP split mode of FIG. 7. In general, when testing this split mode, a recursive coding tree search involving the HOR symmetric split mode for current CU and then recursively splitting the top sub-CU horizontally, has already taken place.

Thus, the first sub-CU of current CU obtained with the HOR_UP split mode has often already been processed. In such case, the encoder choices for that top sub-CU are loaded from the cache, and no other coding decision is searched for the considered sub-CU. Therefore, only one split mode for that sub-CU is envisioned, which is the cached one.

However, in such case, it may happen that the external texture-based split prediction chooses not to use the cached split mode for the considered sub-CU. This may lead to a situation where the NO_SPLIT mode in the set TreeTypeSet of FIG. 19A is tested for the considered sub-CU.

In such case, according to an embodiment, the use of the cached split mode is forced for the considered sub-CU, despite the contradictory prediction provided by the external texture-based split mode prediction.

According to another embodiment, the M best splits modes that have been stored in the encoder choices' cache for the considered sub-CU size and position are evaluated. M is typically equal to 3. Indeed, the encoder caching process may store all the split modes evaluated for each CU position, size and causal environment (e.g. surrounding reconstructed pixels values and motion vectors as in PCT/EP2017/071844), together with the rate distortion cost associated with each evaluated split mode. Thus, the encoder can retrieve the M best split modes that have been found in the past for the considered sub-CU's size and position, regardless of the causal environment of the sub-CU. In a first variant, among the cached M best modes, only the modes that are chosen by the external texture-based split prediction are evaluated. In another variant, all M best modes are evaluated.

A further embodiment deals with the case where the M best split modes that have been stored in the encoder's cache for the current CU's size and spatial position are used for the split mode search of current CU. Indeed, in the preferred mode, only the modes among these M best modes that are selected by the external texture-based split prediction are evaluated. However, it may happen that none of these M best modes is selected by the external texture-based split prediction. In that case, to avoid testing zero split mode for the current CU, the evaluation of all these M best split modes is forced.

Finally, a last embodiment consists in detecting, after the loop on the split modes in the algorithm of FIG. 19, that at least one split mode has been evaluated for current Coding Unit. In case zero split mode has been evaluated by the rate distortion optimization procedure, then the NO_SPLIT mode is evaluated for the current CU.

Therefore, it is ensured that the rate distortion optimization process selects some coding mode(s) for every spatial area in the picture to encode.

Figure 20:
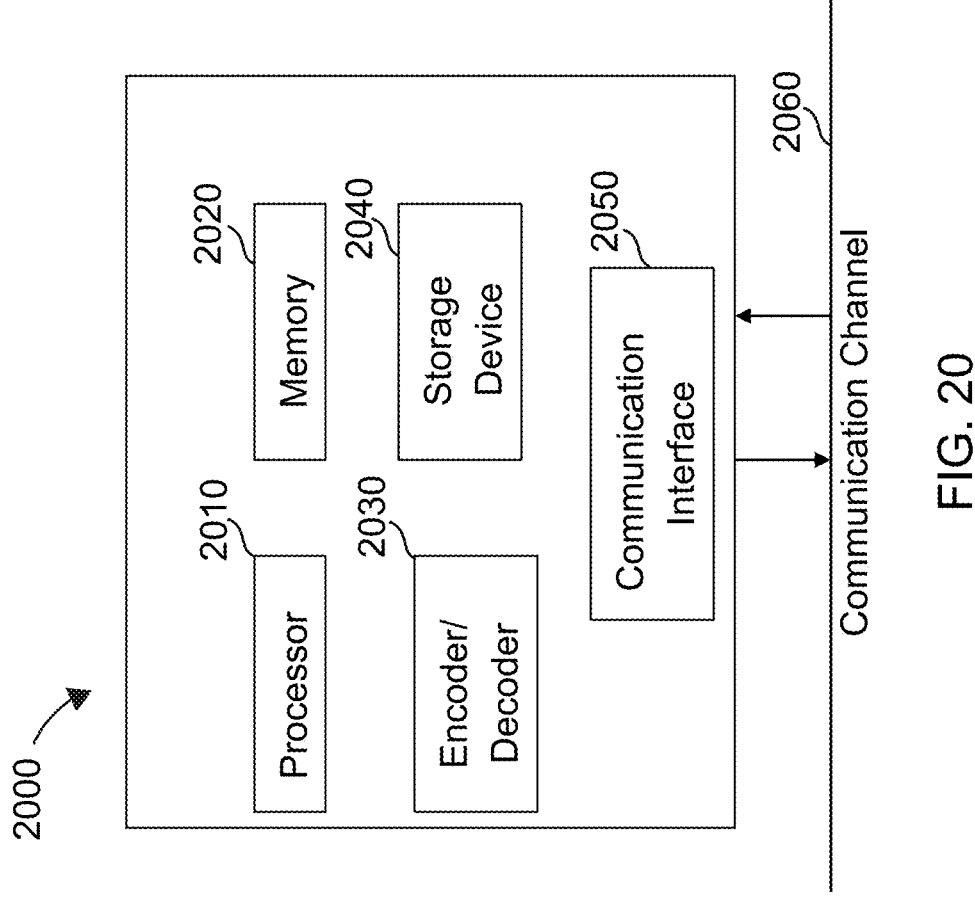
FIG. 20 illustrates a block diagram of an example apparatus in which various aspects of the embodiments may be implemented.

FIG. 20 illustrates a block diagram of an exemplary system 2000 in which various aspects of the exemplary embodiments may be implemented. The system 2000 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. The system 2000 may be communicatively coupled to other similar systems, and to a display via a communication channel as shown in FIG. 20 and as known by those skilled in the art to implement all or part of the exemplary video systems described above.

Various embodiments of the system 200 include at least one processor 2010 configured to execute instructions loaded therein for implementing the various processes as discussed above. The processor 2010 may include embedded memory, input output interface, and various other circuitries as known in the art. The system 2000 may also include at least one memory 2020 (e.g., a volatile memory device, a non-volatile memory device). The system 2000 may additionally include a storage device 2040, which may include non-volatile memory, including, but not limited to, EEPROM, ROM, PROM, RAM, DRAM, SRAM, flash, magnetic disk drive, and/or optical disk drive. The storage device 2040 may comprise an internal storage device, an attached storage device, and/or a network accessible storage device, as non-limiting examples. The system 2000 may also include an encoder module 2030 configured to process data to provide encoded video, and the encoder module 2030 may include its own processor and memory.

The encoder module 2030 represents the module(s) that may be included in a device to perform the encoding functions. As is known, such a device may include one or both of the encoding modules. Additionally, the encoder module 2030 may be implemented as a separate element of the system 2000 or may be incorporated within one or more processors 2010 as a combination of hardware and software as known to those skilled in the art.

Program code to be loaded onto one or more processors 2010 to perform the various processes described hereinabove may be stored in the storage device 2040 and subsequently loaded onto the memory 2020 for execution by the processors 2010. In accordance with the exemplary embodiments, one or more of the processor(s) 2010, the memory 2020, the storage device 2040, and the encoder module 2030 may store one or more of the various items during the performance of the processes discussed herein above, including, but not limited to the input video, the decoded video, the bitstream, equations, formulas, matrices, variables, operations, and operational logic.

The system 2000 may also include a communication interface 2050 that enables communication with other devices via a communication channel 2060. The communication interface 2050 may include, but is not limited to a transceiver configured to transmit and receive data from the communication channel 2060. The communication interface 2050 may include, but is not limited to, a modem or network card and the communication channel 2050 may be implemented within a wired and/or wireless medium. The various components of the system 2000 may be connected or communicatively coupled together (not shown) using various suitable connections, including, but not limited to internal buses, wires, and printed circuit boards.

The exemplary embodiments may be carried out by computer software implemented by the processor 2010 or by hardware, or by a combination of hardware and software. As a non-limiting example, the exemplary embodiments may be implemented by one or more integrated circuits. The memory 2020 may be of any type appropriate to the technical environment and may be implemented using any appropriate data storage technology, such as optical memory devices, magnetic memory devices, semiconductor-based memory devices, fixed memory, and removable memory, as non-limiting examples. The processor 2010 may be of any type appropriate to the technical environment, and may encompass one or more of microprocessors, general purpose computers, special purpose computers, and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Furthermore, one skilled in the art may readily appreciate that the exemplary encoder 100 shown in FIG. 9 may be modified according to the above teachings in order to implement the disclosed improvements to the exiting video coding standards for achieving better compression/decompression. For example, image partitioning 105, may be modified according to the disclosed teachings.

The invention claimed is:

1. An encoding method comprising:
   determining a split mode based on a rate-distortion optimization using a texture-based split prediction set obtained for a block to encode, wherein determining the split mode comprises adapting the texture-based split prediction set according to a binary or triple split mode non-redundancy constraint, wherein the binary or triple split mode non-redundancy constraint disallows split modes for a block so that at most one series of spatial divisions of the block provides a given set of boundaries within the block; and
   encoding the block using the determined split mode.

2. The method of claim 1, wherein the texture-based split prediction set comprises for at least one split mode possible for the block, an indicator indicating whether the at least one split mode is likely to be chosen for the block during the rate-distortion optimization.

3. The method of claim 2, wherein adapting the texture-based split prediction set according to the binary or triple split mode non-redundancy constraint comprises:
   checking, for split modes from the texture-based split prediction set that are likely to be chosen for the block during the rate-distortion optimization, if the split modes are allowed by the binary or triple split mode non-redundancy constraint; and
   if none of the split modes from the texture-based split prediction set that are likely to be chosen for the block during the rate-distortion optimization are allowed by the binary or triple split mode non-redundancy constraint, forcing at least one split mode allowed by the binary or triple split mode non-redundancy constraint to be evaluated in the rate-distortion optimization.

4. The method of claim 3, wherein all split modes allowed by the binary or triple split mode non-redundancy constraint are forced to be evaluated in the rate-distortion optimization.

5. The method of claim 3, wherein only the first binary or triple split mode of the texture-based split prediction set is forced to be evaluated in the rate-distortion optimization.

6. The method of claim 3, wherein at least the first horizontal binary or triple split mode and the first vertical binary or triple split mode of the texture-based split prediction set are forced to be evaluated in the rate-distortion optimization.

7. The method of claim 1, wherein the binary or triple split mode non-redundancy constraint depends on a binary or triple tree depth of the block.

8. An encoding apparatus comprising electronic circuitry configured for:
   determining a split mode based on a rate-distortion optimization using a texture-based split prediction set obtained for a block, wherein determining the split mode comprises adapting the texture-based split prediction set according to a binary or triple split mode non-redundancy constraint, wherein the binary or triple split mode non-redundancy constraint disallows split modes for a block so that at most one series of spatial divisions of the block provides a given set of boundaries within the block; and
   encoding the block using the determined split mode.

9. The apparatus of claim 8, wherein the texture-based split prediction set comprises for at least one split mode possible for the block, an indicator indicating whether the at least one split mode is likely to be chosen for the block during the rate-distortion optimization.

10. The apparatus of claim 9, wherein adapting the texture-based split prediction set according to the binary or triple split mode non-redundancy constraint comprises:
    checking, for split modes from the texture-based split prediction set that are likely to be chosen for the block during the rate-distortion optimization, if the split modes are allowed by the binary or triple split mode non-redundancy constraint; and
    if none of the split modes from the texture-based split prediction set that are likely to be chosen for the block during the rate-distortion optimization are allowed by the binary or triple split mode non-redundancy constraint, forcing at least one split mode allowed by the binary or triple split mode non-redundancy constraint to be evaluated in the rate-distortion optimization.

11. The apparatus of claim 10, wherein all split modes allowed by the binary or triple split mode non-redundancy constraint are forced to be evaluated in the rate-distortion optimization.

12. The apparatus of claim 10, wherein only the first binary or triple split mode of the texture-based split prediction set is forced to be evaluated in the rate-distortion optimization.

13. The apparatus of claim 10, wherein at least the first horizontal binary or triple split mode and the first vertical binary or triple split mode of the texture-based split prediction set are forced to be evaluated in the rate-distortion optimization.

14. The apparatus of claim 8, wherein the binary or triple split mode non-redundancy constraint depends on a binary or triple tree depth of the block.

15. A non-transitory computer readable storage medium storing program code instructions that, when executed by a processor, cause the processor to perform:
    determining a split mode based on a rate-distortion optimization using a texture-based split prediction set obtained for a block, wherein determining the split mode comprises adapting the texture-based split prediction set according to a binary or triple split mode non-redundancy constraint, wherein the binary or triple split mode non-redundancy constraint disallows split modes for a block so that at most one series of spatial divisions of the block provides a given set of boundaries within the block; and
    encoding the block using the determined split mode.

16. The non-transitory computer readable storage medium of claim 15, wherein the texture-based split prediction set comprises for at least one split mode possible for the block, an indicator indicating whether the at least one split mode is likely to be chosen for the block during the rate-distortion optimization.

17. The non-transitory computer readable storage medium of claim 16, wherein adapting the texture-based split prediction set according to the binary or triple split mode non-redundancy constraint comprises:

checking, for split modes from the texture-based split prediction set that are likely to be chosen for the block during the rate-distortion optimization, if the split modes are allowed by the binary or triple split mode non-redundancy constraint; and if none of the split modes from the texture-based split prediction set that are likely to be chosen for the block during the rate-distortion optimization are allowed by the binary or triple split mode non-redundancy constraint, forcing at least one split mode allowed by the binary or triple split mode non-redundancy constraint to be evaluated in the rate-distortion optimization.

18. The non-transitory computer readable storage medium of claim 17, wherein all split modes allowed by the binary or triple split mode non-redundancy constraint are forced to be evaluated in the rate-distortion optimization.

19. The non-transitory computer readable storage medium of claim 17, wherein only the first binary or triple split mode of the texture-based split prediction set is forced to be evaluated in the rate-distortion optimization.

20. The non-transitory computer readable storage medium of claim 17, wherein at least the first horizontal binary or triple split mode and the first vertical binary or triple split mode of the texture-based split prediction set are forced to be evaluated in the rate-distortion optimization.

* * * * *